(12) United States Patent  
Hirai et al.

(10) Patent No.: US 6,603,928 B2
(45) Date of Patent: Aug. 5, 2003

(54) PHOTOMETRY DEVICE

(75) Inventors: Isamu Hirai, Tokyo (JP); Yoshikazu Iida, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/987,564

(22) Filed: Nov. 15, 2001

(65) Prior Publication Data

US 2002/0102104 A1 Aug. 1, 2002

(30) Foreign Application Priority Data

Nov. 17, 2000 (JP) ........................................ 2000-350732

(51) Int. Cl.$^7$ ................................................. G03B 7/00
(52) U.S. Cl. ...................... 396/63; 396/121; 396/227; 396/234
(58) Field of Search ................... 396/225, 233, 396/234, 63, 121–123, 227

(56) References Cited

U.S. PATENT DOCUMENTS

| 5,012,268 A | 4/1991 | Hirai ........................ 396/227 |
| 5,596,387 A | 1/1997 | Takagi ..................... 396/225 X |
| 5,710,948 A | 1/1998 | Takagi ..................... 396/225 X |
| 5,740,481 A | * 4/1998 | Iwasaki et al. ............. 396/225 |
| 5,896,014 A | 4/1999 | Ogawa et al. ........... 315/241 P |
| 5,987,265 A | 11/1999 | Iwasaki ....................... 396/225 |

FOREIGN PATENT DOCUMENTS

| JP | 63271239 | 11/1988 | ............ G03B/7/20 |
| JP | 5-340804 | 12/1993 | ............ G01J/1/02 |
| JP | 7-84299 | 3/1995 | ............ G03B/7/28 |
| JP | 10253449 | 9/1998 | ............ G01J/1/44 |

* cited by examiner

Primary Examiner—W. B. Perkey
(74) Attorney, Agent, or Firm—Greenblum & Bernstein, P.L.C.

(57) ABSTRACT

A photometry device for a camera is provided with a normal light sensor having a spectral sensitive characteristics close to those of a human eye, and a plurality of colorimetric sensors. The device further includes a photometry value determining system, a colorimetric compensation value determining system that determines a color of an object at each of the plurality of photometry areas and a colorimetric compensation value based on the determined color, and an exposure value determining system that compensates for the photometry value determined by the photometry value determining system for each of the plurality of photometry areas, and determines an exposure value based on the compensated photometry values. In the photometry device configured as above, the colorimetric compensation value determining system determines different colorimetric compensation values for different one of the plurality of photometry areas.

31 Claims, 20 Drawing Sheets (EEPROM)

|  |  | THvalue | coefficient | CCcoefficient | CCadjustment |
|---|---|---|---|---|---|
| GREEN | g1 | 8 | 3/4 | 0 | 0 |
|  | g2 |  | 3/4 |  |  |
| BLUE | b1 | 8 | 3/4 | 2/16 | 2 |
|  | b2 |  | 3/4 |  |  |
| RED | r1 | 15 | 3/4 | 1/16 | 2 |
|  | r2 |  | 3/4 |  |  |
| MAGENTA | m1 | −40 |  | 0 | 0 |
| YELLOW | y1 | −9 |  | 1 | −4 |
| CYAN | c1 | −40 |  | 0 | 0 |

(E) COLORIMETRIC COMPENSATION VALUES MODIFIED IN ACCORDANCE WITH THE FOCUSING CONDITION DATA ARE SELECTED (D) COLORIMETRIC COMPENSATION VALUES ARE CALCULATED IN ACCORDANCE WITH THE DATA INTRINSIC TO THE PHOTOGRAPHING LENS (C) COLORIMETRIC COMPENSATION VALUES MODIFIED IN ACCORDANCE WITH THE DATA INTRINSIC TO THE PHOTOGRAPHING LENS ARE SELECTED (B) COLORIMETRIC COMPENSATION VALUES MODIFIED IN ACCORDANCE WITH A DISTANCE FROM THE CENTER OF THE PHOTOGRAPHING FRAME ARE SELECTED, CALCULATED IN ACCORDANCE WITH A DISTANCE FROM THE CENTER OF THE PHOTOGRAPHING FRAME (A) NO COMPENSATION FOR COLORIMETRIC COMPENSATION VALUES(DEFAULT)

| | TABLES | (A) | (B) | (C) | (D) | (E) |
|---|---|---|---|---|---|---|
| DEFAULT | 1 | ○ | | | | |
| VALUES VARYING DEPENDING ON DISTANCE FROM THE CENTER | 2,3,4,5 | | ○ | | | |
| VALUES VARYING DEPENDING ON DATA INTRINSIC TO LENS | 6,7,8,9 | | | ○ | | |
| VALUES VARYING DEPENDING ON DATA INTRINSIC TO LENS | 10,11,12 | | | | ○ | |
| VALUES VARYING DEPENDING ON FOCUSING CONDITION | 13 | | | | | ○ |

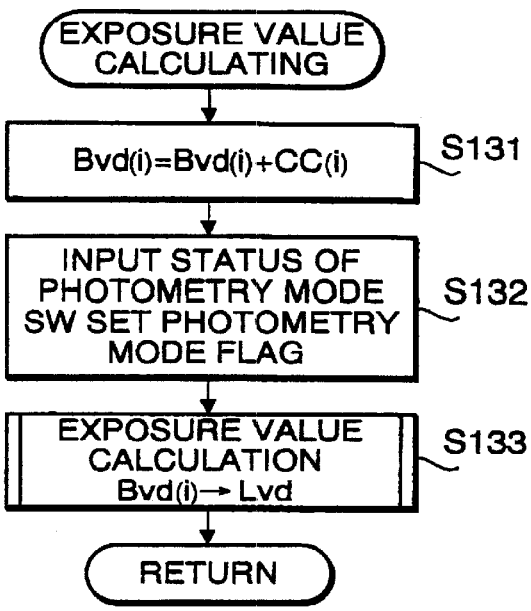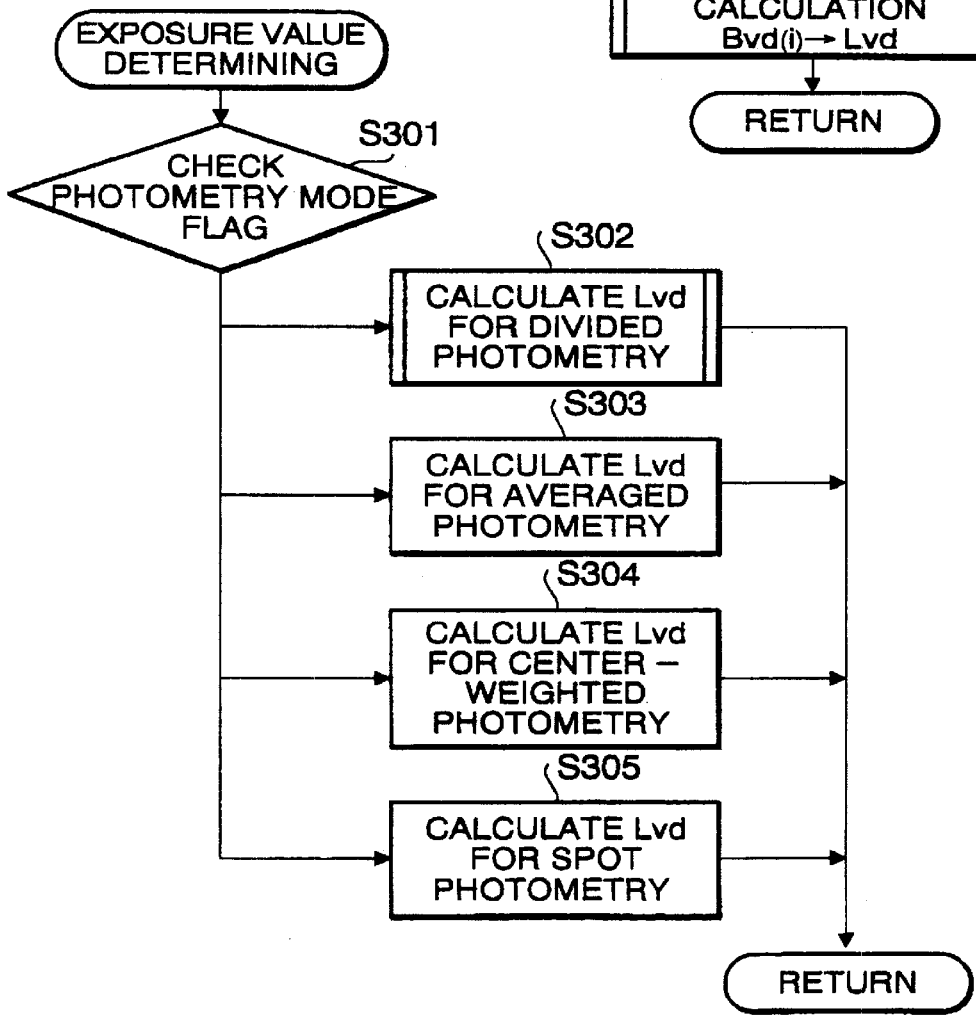

PHOTOMETRY DEVICE

BACKGROUND OF THE INVENTION

The present invention relates to a photometry device applicable to an SLR (Single Lens Reflex) camera, and more particularly to a photometry device with which exposure errors due to a difference of reflectivity of objects having different colors can be compensated.

Recently, reflection type photometry devices have been employed in most of cameras. The reflection type photometry device receives the light, which is reflected by an object and passed through an observing optical system of a camera, using a light receiving element, determines the brightness of the object based on the output of the measured value, and then calculates the exposure value of the camera based on the measured brightness.

However, this type of the photometry device cannot detect the color of the object because of its structure. Accordingly, in such a device, the reflectivity of an object is generally assumed to be 18% and the exposure parameter is determined on this assumption. Therefore, regarding a whitish object whose reflectivity is greater than 18%, the determined brightness is greater than the actual brightness because the determined brightness assumes only 18% reflectivity contributing to the brightness, when the reflectivity contribution is actually higher. If the camera controls an exposure operation based on the determined exposure value, the object is under exposed. A dark object whose reflectivity is less than 18% is measured to have a lower brightness than the actual brightness because the measured brightness assumes 18% reflectivity contributing to the brightness, when the reflectivity is actually lower. Therefore, such an object is over exposed. The difference of the reflectivity of the object may also occur depending on the color of the object. For example, when the color of an object is yellow, the reflectivity may be up to 70%. In such a case, if the standard reflectivity is assumed to be 18%, the exposure value is approximately 2 Ev lower than necessary. If the object color is blue, the reflectivity is approximately 9%. In this case, the object is over exposed by approximately 1 Ev greater than necessary.

Therefore, when the conventional photometry device is used, the photographer is required to guess the reflectivity of the object. Then, based on the reflectivity determined by the photographer, the exposure is controlled such that, if the object is a whitish or yellowish one having a relatively high reflectivity, it is to be overexposed, and if the object is a blackish or bluish one having a relatively low reflectivity, it is to be underexposed. With this operation, the above-described defects may be solved. However, accurately guessing the reflectivity of the object and controlling the exposure can only be done by experienced and skilled photographers. It is impossible to require all the photographers to do such an operation. Further, it is not preferable that a manual operation of the photographer is required for exposure. Furthermore, if such a manual operation is required, cameras become unsuitable for automatic photographing which is the recent trend.

SUMMARY OF THE INVENTION

It is therefore an object of the invention to provide an improved photometry device with which appropriate exposure values can be obtained when the device is configured such that a photographing frame is divided into a plurality of areas and colorimetric compensation values, which are used for compensating an exposure value, are obtained at the divided areas.

For the above object, according to the invention, there is provided a photometry device for a camera, which is provided with a normal light sensor that has a plurality of photometry areas and performs a photometry operation with respect to an object at each of the plurality of photometry areas, the normal light sensor having a spectral sensitive characteristics close to those of a human eye, a photometry value determining system that determines an photometry value at each of the plurality of photometry areas in accordance with outputs of the normal light sensor corresponding to the plurality of photometry areas, a plurality of colorimetric sensors for colorimetry capable of performing photometry with respect to each of the plurality of photometry areas, the plurality of colorimetric sensors having different spectral sensitivity characteristics, a colorimetric compensation value determining system that determines a color of an object at each of the plurality of photometry areas in accordance with the outputs of the plurality of colorimetric sensors and determining a colorimetric compensation value based on the determined color, and an exposure value determining system that compensates for the photometry value determined by the photometry value determining system for each of the plurality of photometry areas, and determines an exposure value based on the compensated photometry values. In the photometry device configured as above, the colorimetric compensation value determining system determines different colorimetric compensation values for different one of the plurality of photometry areas.

With this configuration, it becomes possible to determine appropriate colorimetric compensation values depending on the arrangement of the areas within a photographing frame.

In a particular case, the colorimetric compensation value determining system may determine the colorimetric compensation values such that a colorimetric compensation value at a peripheral area of a photographing frame is smaller than that of a central area of the photographing frame.

Alternatively, the colorimetric compensation value determining system may determine the colorimetric compensation values for the plurality of photometry areas depending on a distance of each photometry area with respect to the center of a photographing frame.

In such a case, a colorimetric compensation value at an area farther from the center of the photographing frame may be smaller than that at an area closer to the center of the photographing frame.

Further alternatively, the colorimetric compensation value determining system may determine the colorimetric compensation values for the plurality of photometry areas depending on data intrinsic to a photographing lens that forms an image of the object.

In this case, the data intrinsic to the photographing lens may include at least one of a focal length of the photographing lens, an exit pupil position of the photographing lens, and an open f-number of the photographing lens.

Alternatively or optionally, the data intrinsic to the photographing lens may include a focal length of the photographing lens, and a colorimetric compensation value has a greatest absolute value when the focal length is within a predetermined range, the colorimetric compensation value being smaller when the focal length is greater or smaller than the predetermined range.

In this case, the colorimetric compensation value may be determined as a function of the focal length.

Alternatively or optionally, the data intrinsic to the photographing lens may include an exit pupil position of the photographing lens, and a colorimetric compensation value has a greatest absolute value when the exit pupil position is within a predetermined range, the colorimetric compensation value being smaller when the exit pupil position is on a front side or rear side with respect to the predetermined range.

Also in this case, the colorimetric compensation value may be determined as a function of the exit pupil position.

Still alternatively or optionally, the data intrinsic to the photographing lens may include an open f-number of the photographing lens, and a colorimetric compensation value has a greatest absolute value when the open f-number is within a predetermined range. In this case, the colorimetric compensation value may be smaller when the open f-number is smaller or greater than the predetermined range.

In a particular case, the colorimetric compensation value may be determined as a function of the open f-number.

Further alternatively or optionally, the colorimetric compensation value determining system may determine the colorimetric compensation values for the plurality of photometry areas depending on an area corresponding to a part of an object on which a photographing lens is focused.

In this case, a colorimetric compensation value for an area corresponding to a part of the object on which the photographing lens is focused is greater than that for an area corresponding to another part of the object on which the photographing lens is not focused.

Optionally, the exposure amount determining system may have at least one of:

a. a function of determining the exposure amount by performing a divided photometry, based on the compensated photometry values, in accordance with a predetermined algorithm:

b. a function of determining the exposure amount by averaging the compensated photometry values for the plurality of photometry areas;

c. a function of determining the exposure amount by performing the center-weighted averaging of the compensated photometry values; and d. a function of determining the exposure amount by selecting one of the compensated photometry values corresponding to the plurality of areas.

Further optionally, the normal light photometry sensor and the plurality of colorimetric photometry sensors may be arranged on an eyepiece side of a pentagonal prism of a single lens reflex camera, at least the normal light photometry sensor being arranged at an upper central portion of the pentagonal prism.

BRIEF DESCRIPTION OF THE ACCOMPANYING DRAWINGS

FIG. 1 shows a perspective view of a camera employing a photometry device according to the invention;

FIG. 2 schematically shows main components of the camera shown in FIG. 1;

Figure 4A:
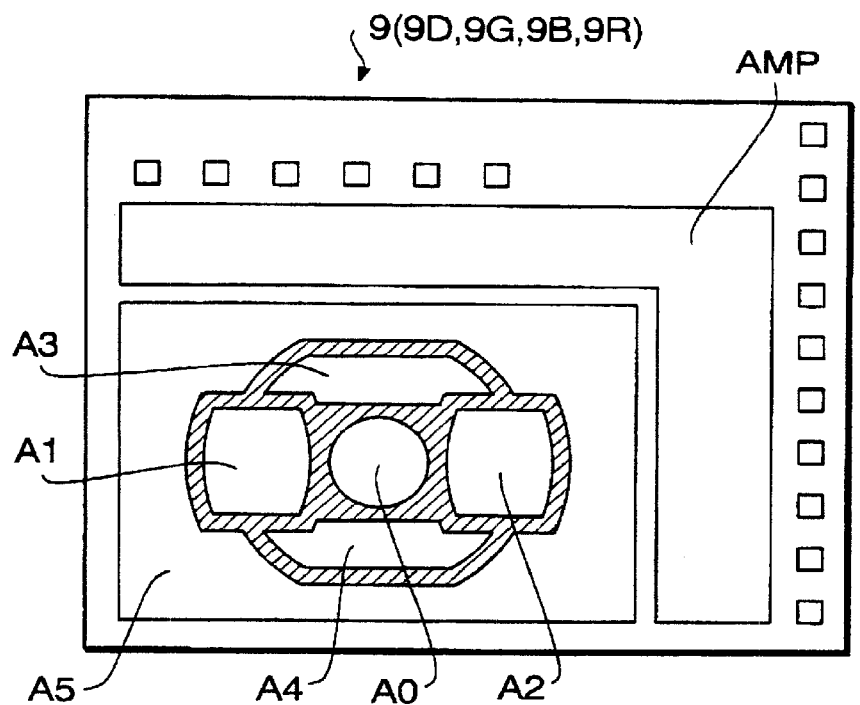
Figure 4B:
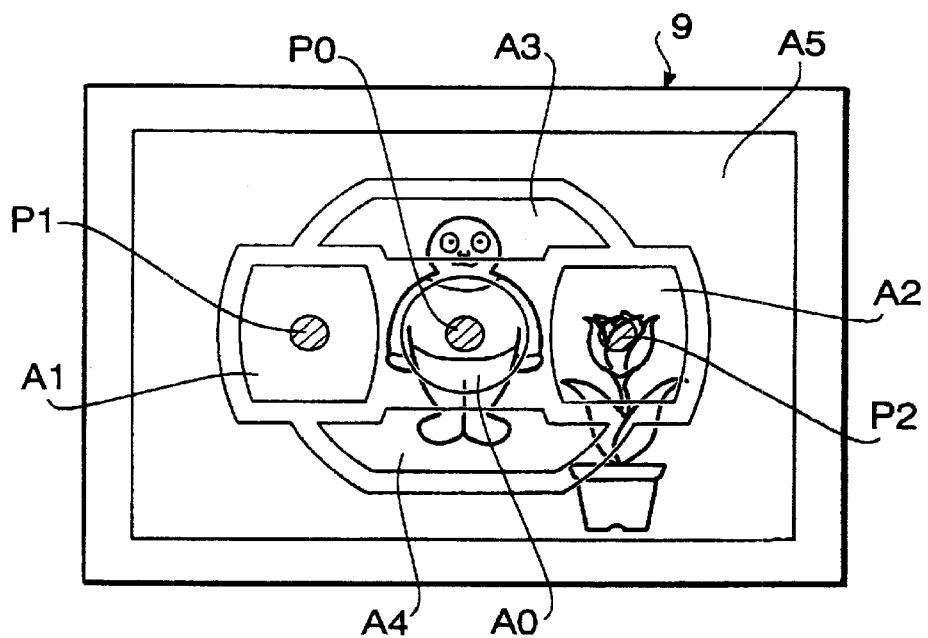
Figure 5:
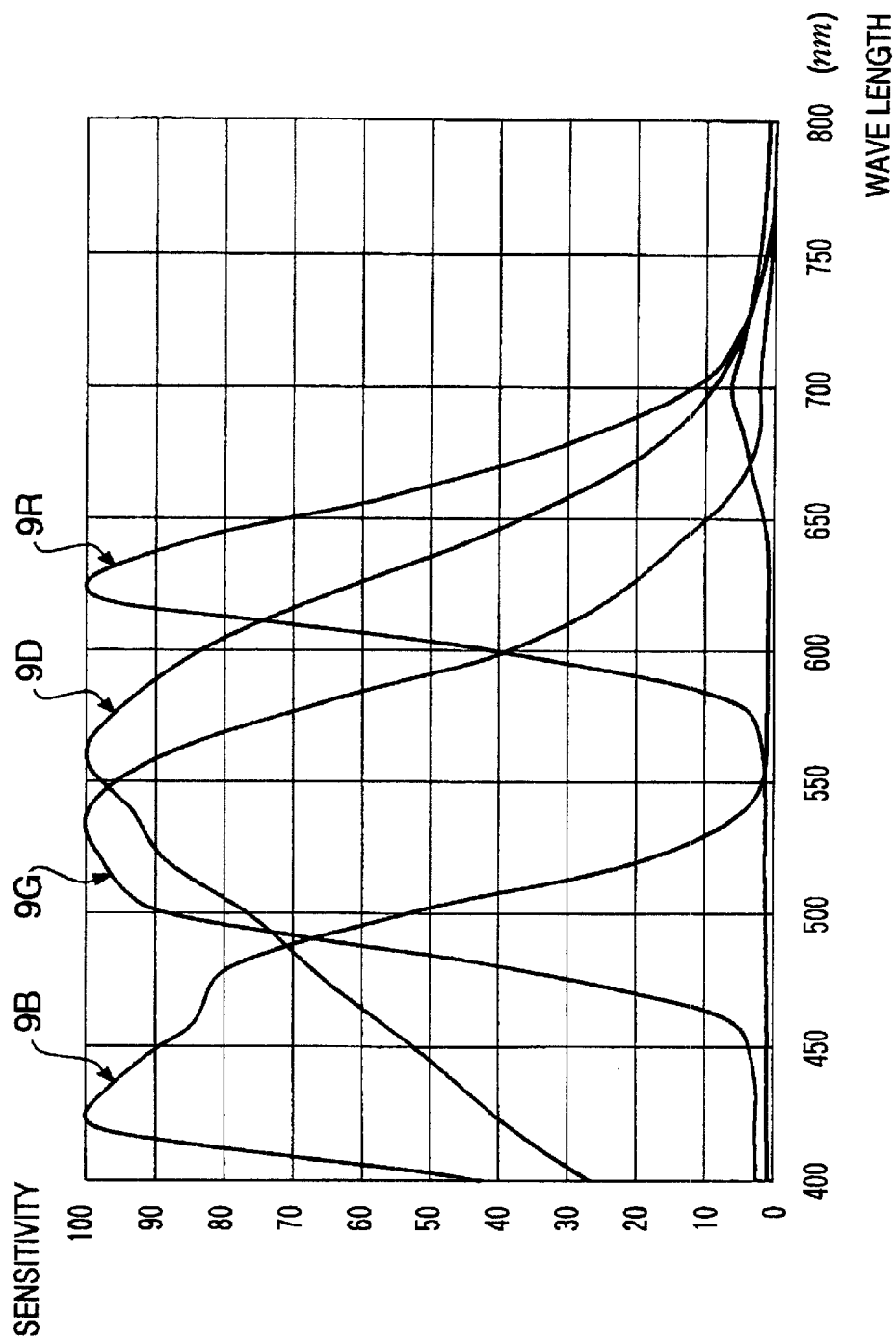
Figure 6:
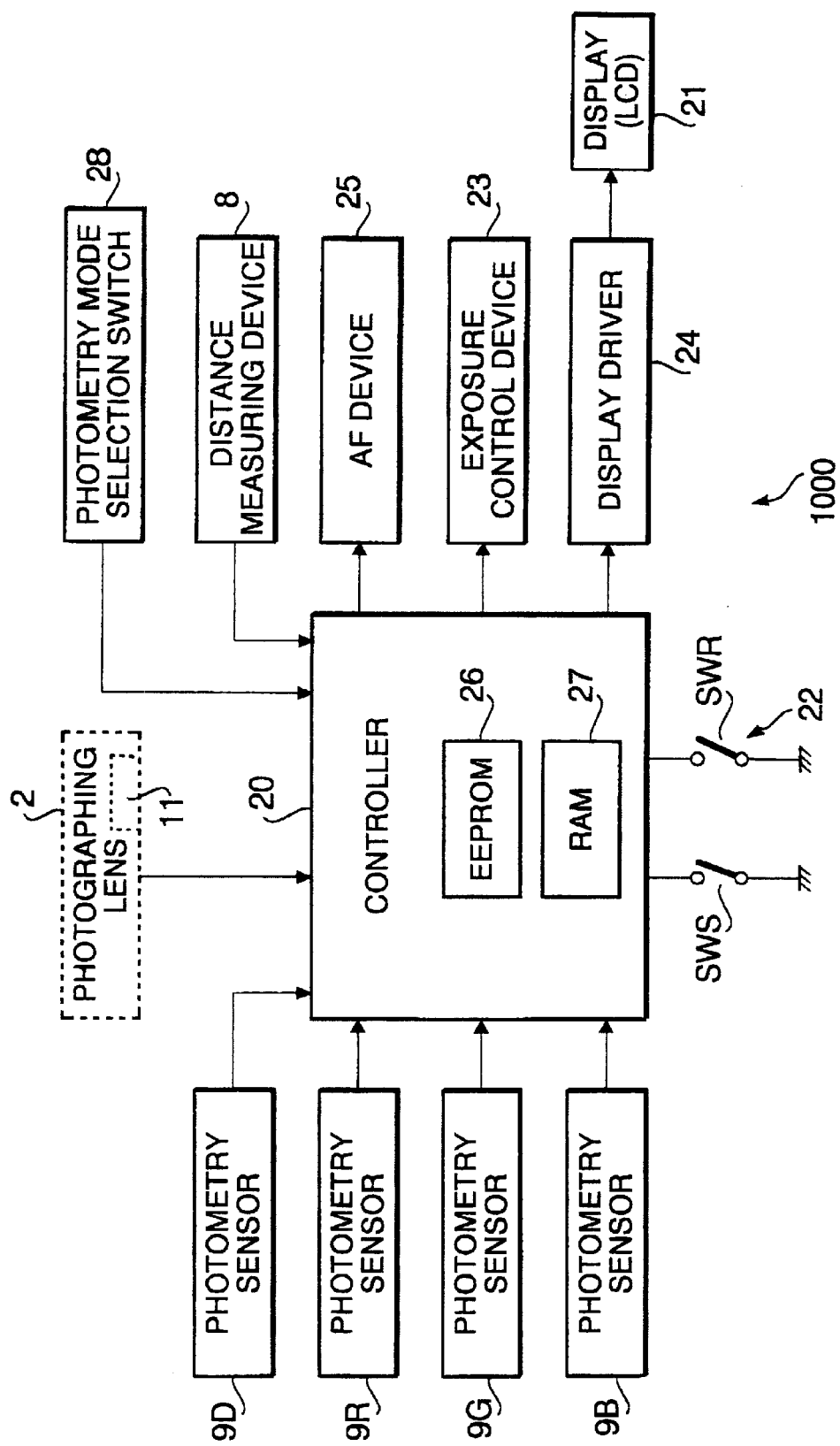
Figure 7:
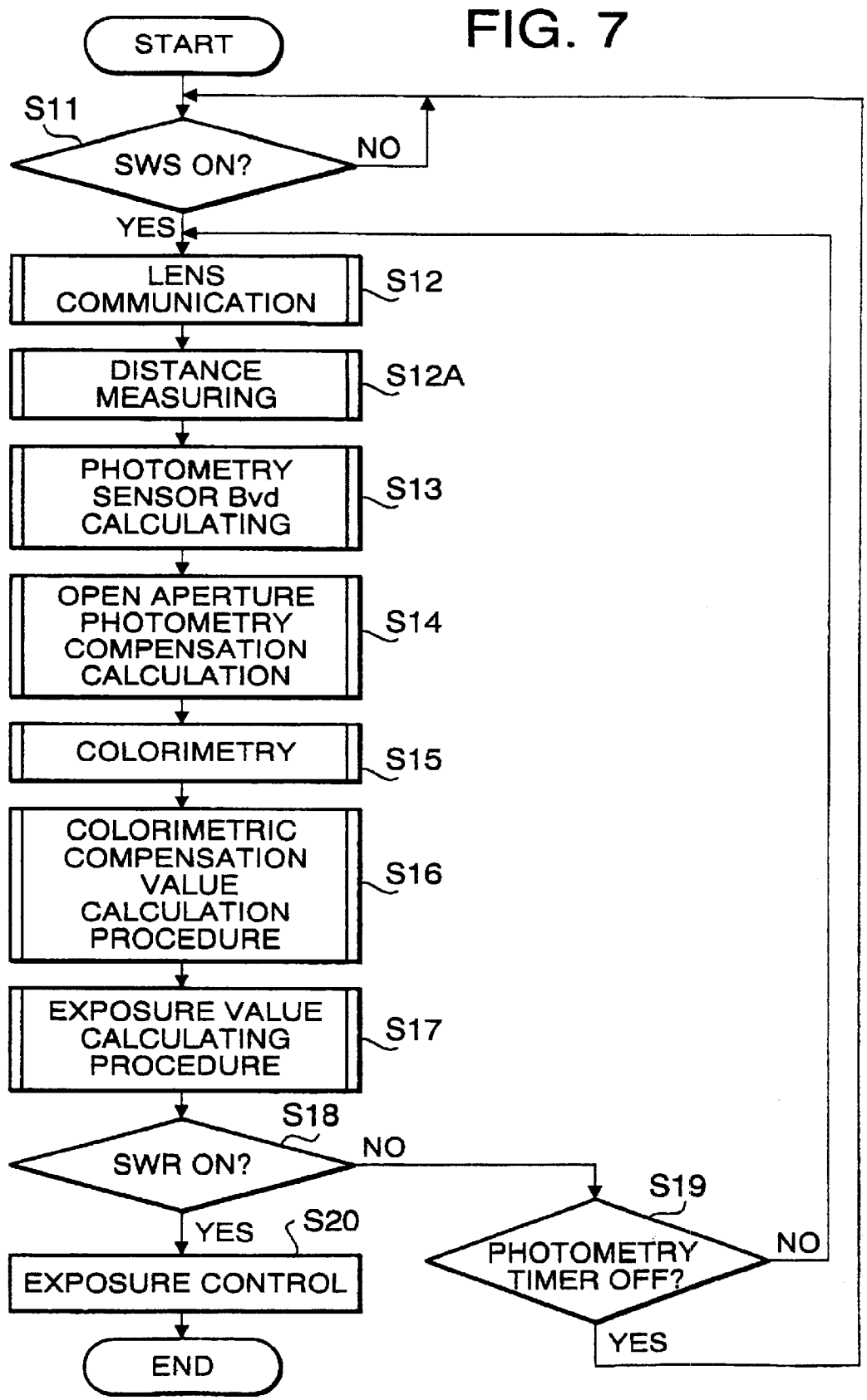
Figure 8:
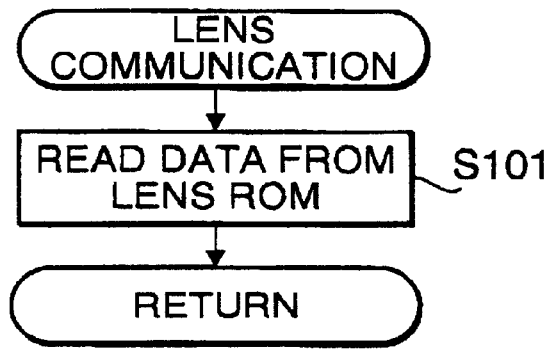
Figure 9:
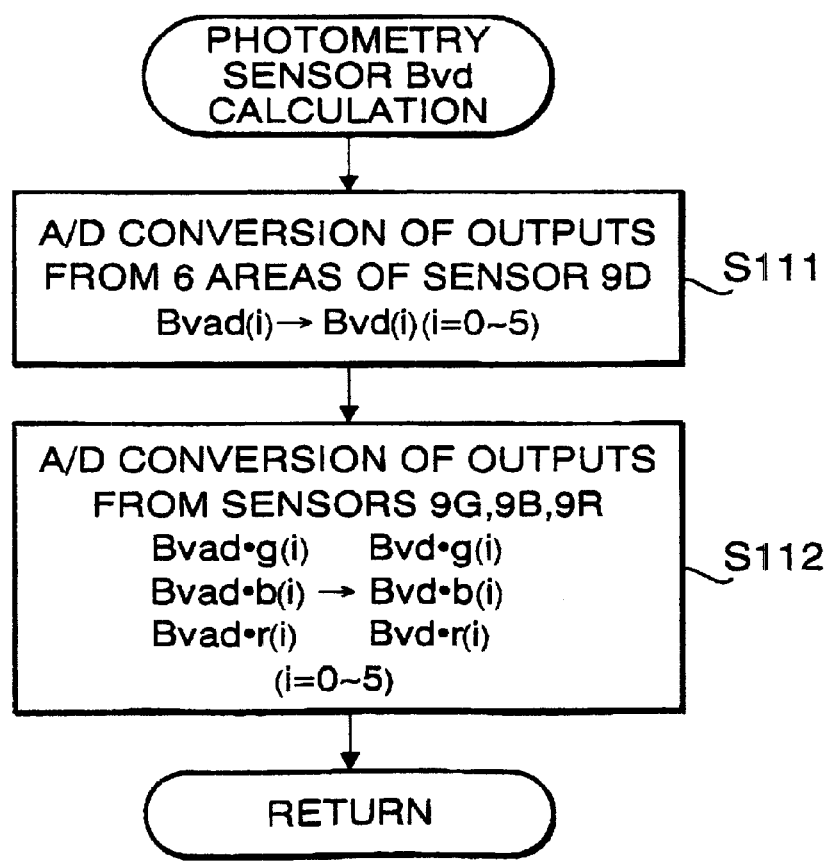
Figure 10:
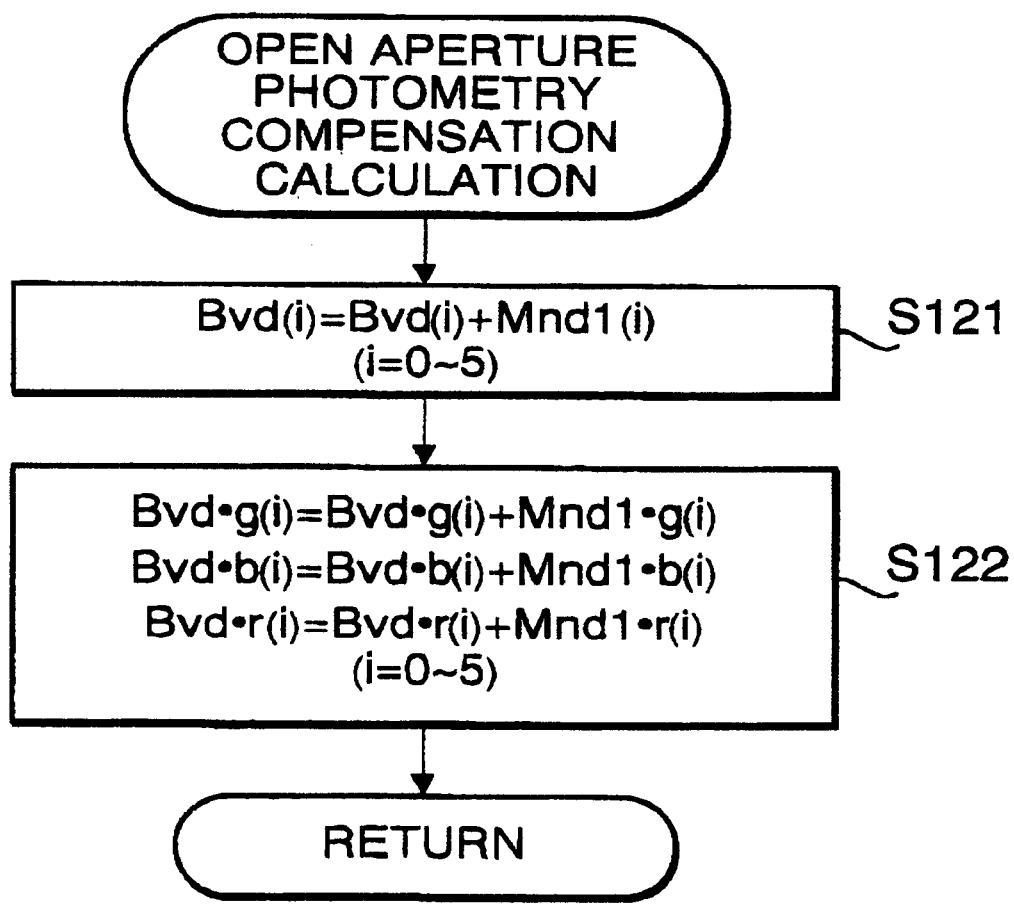
Figure 11:
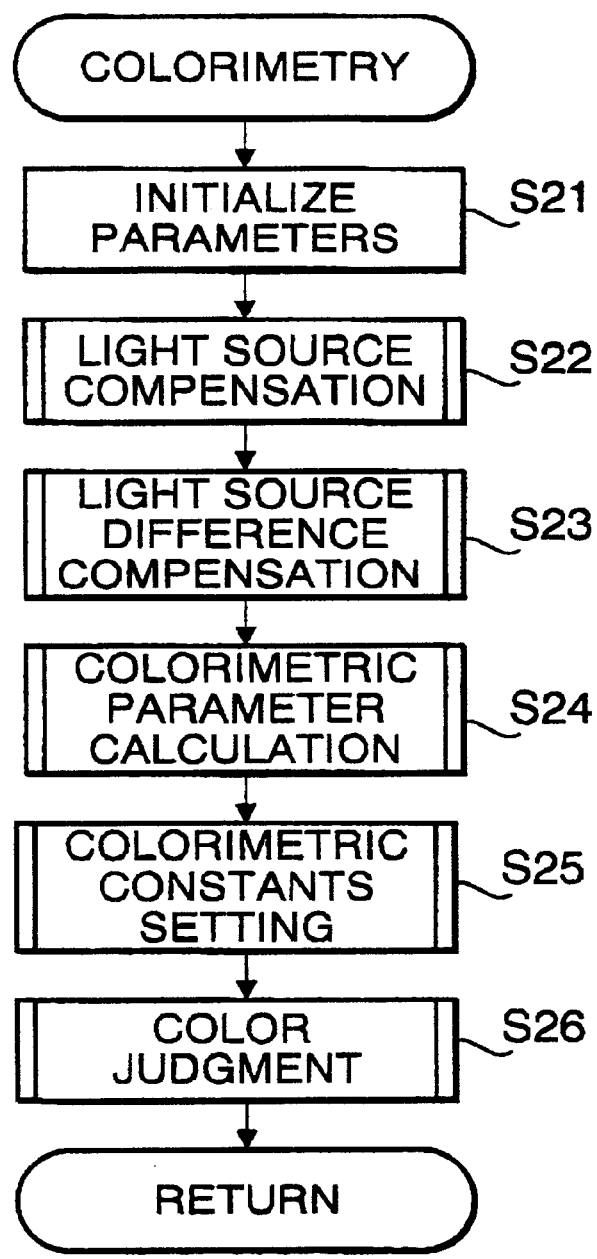
Figure 12:
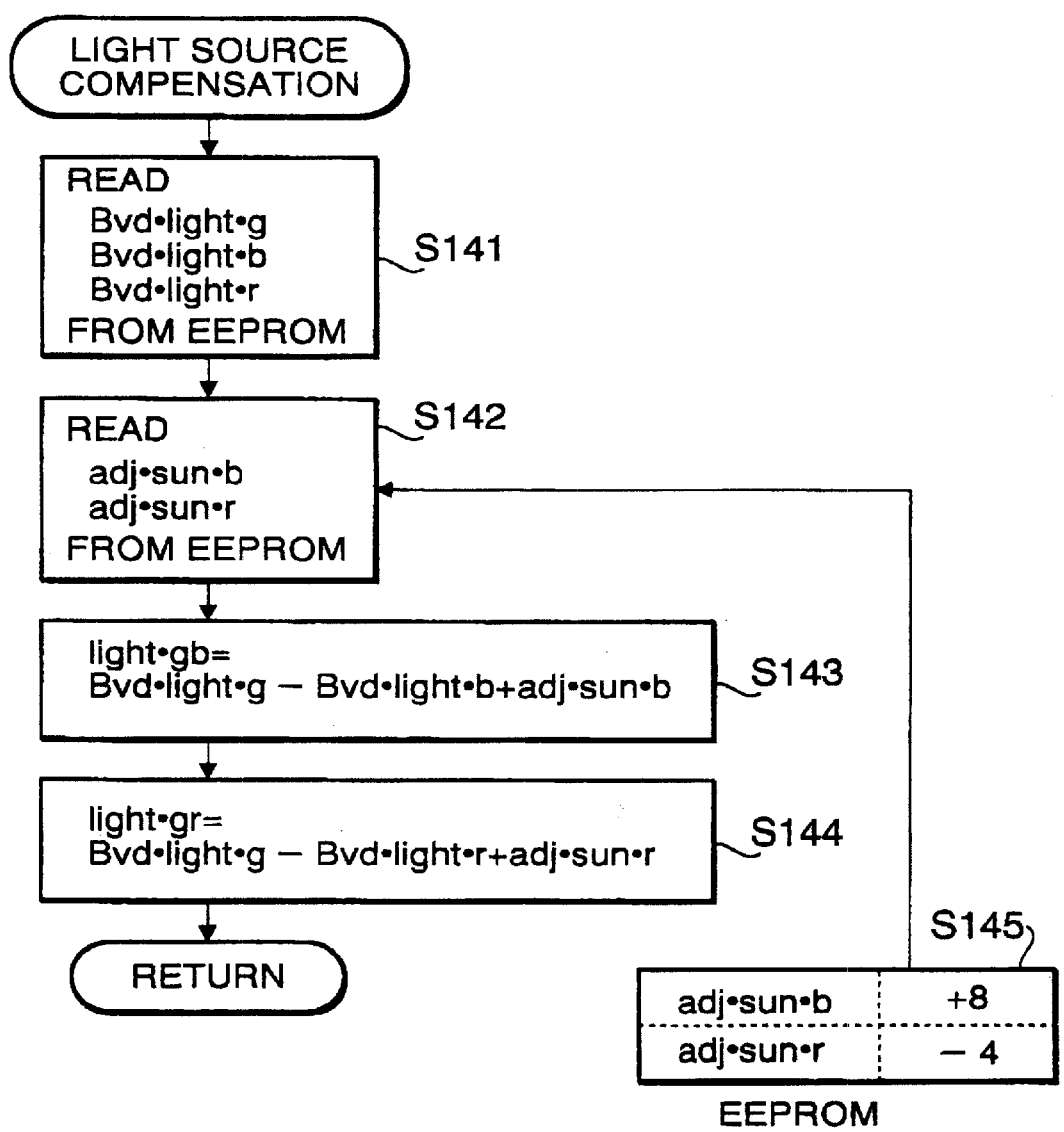
Figure 13:
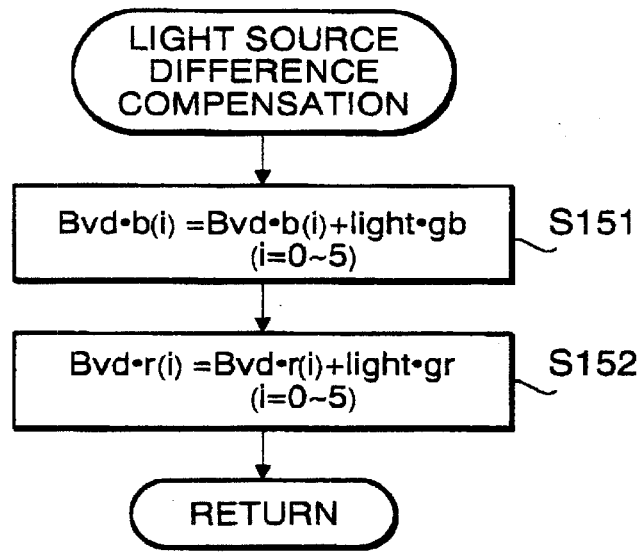
Figure 14:
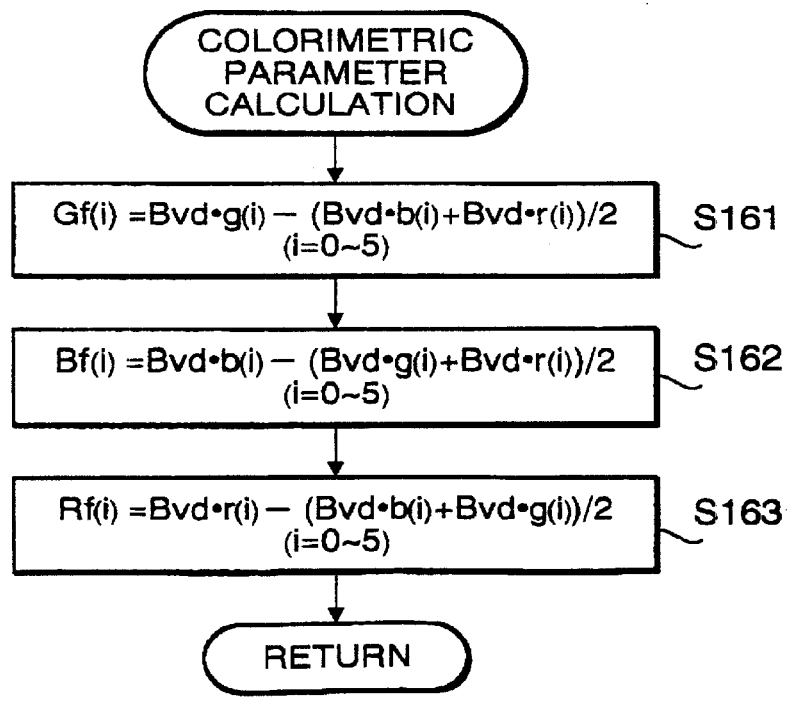
Figure 15:
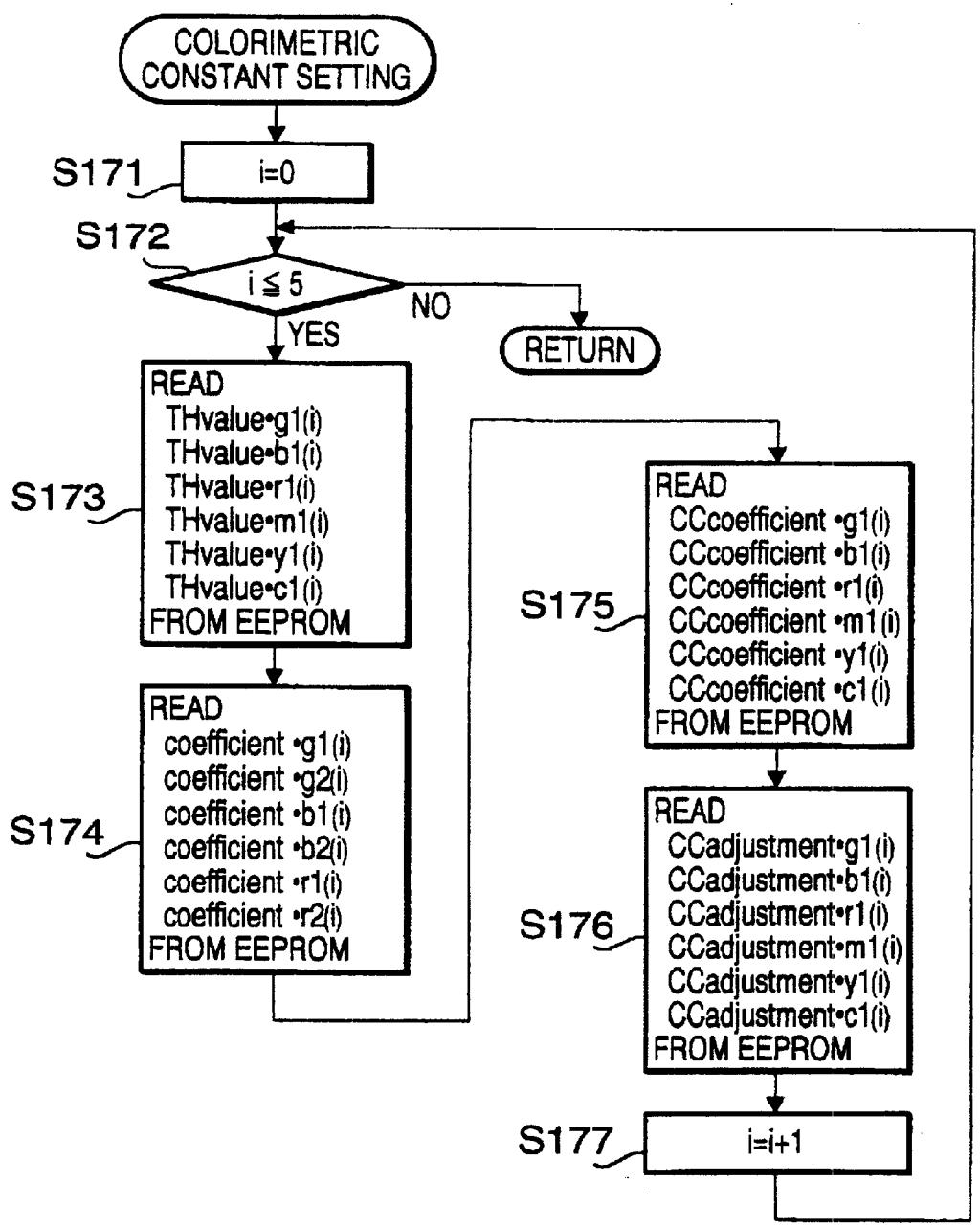
Figure 17:
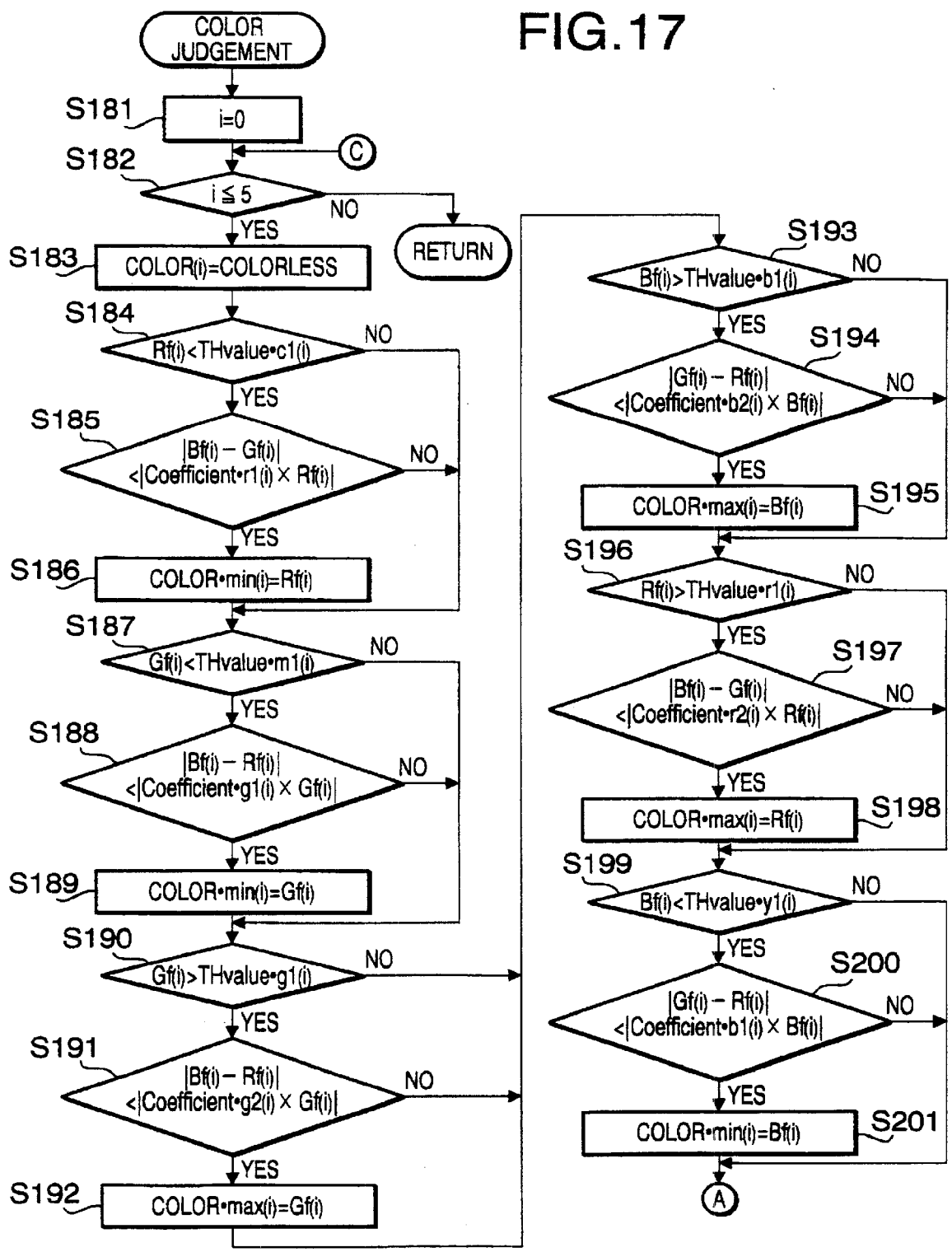
Figure 18:
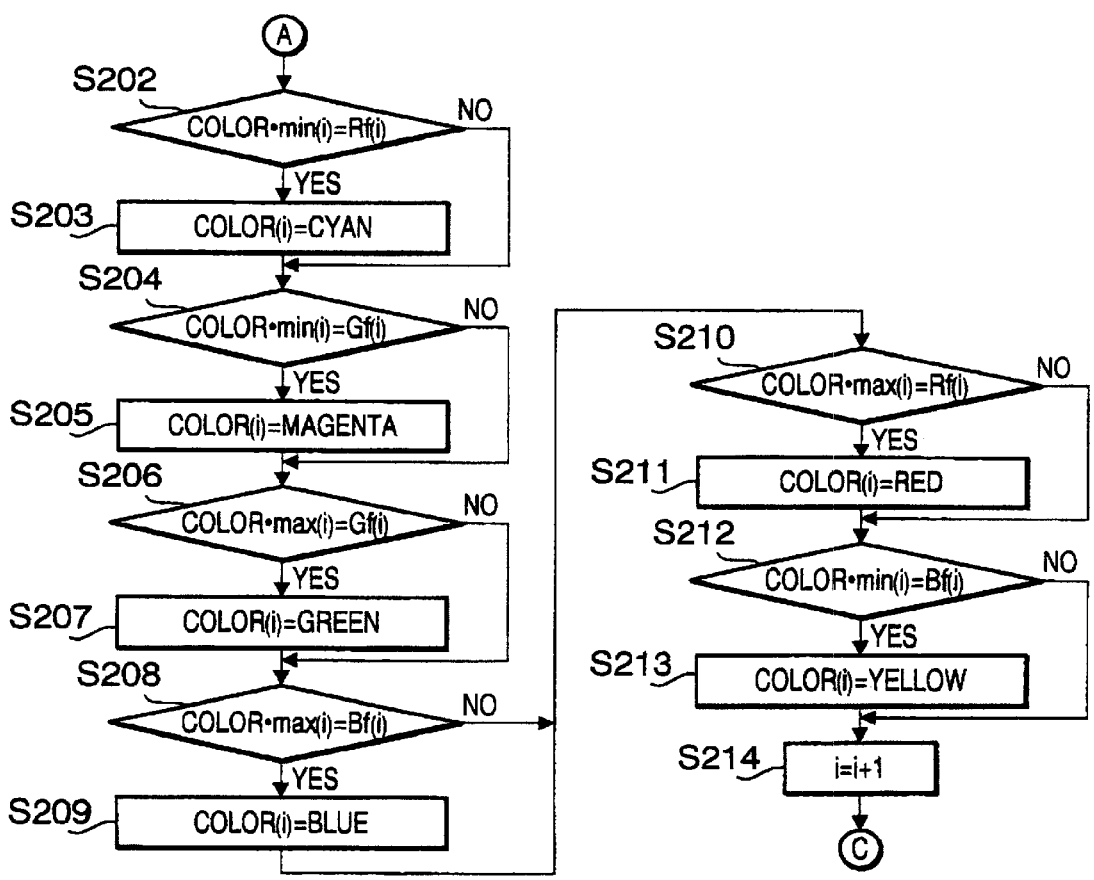
Figure 19:
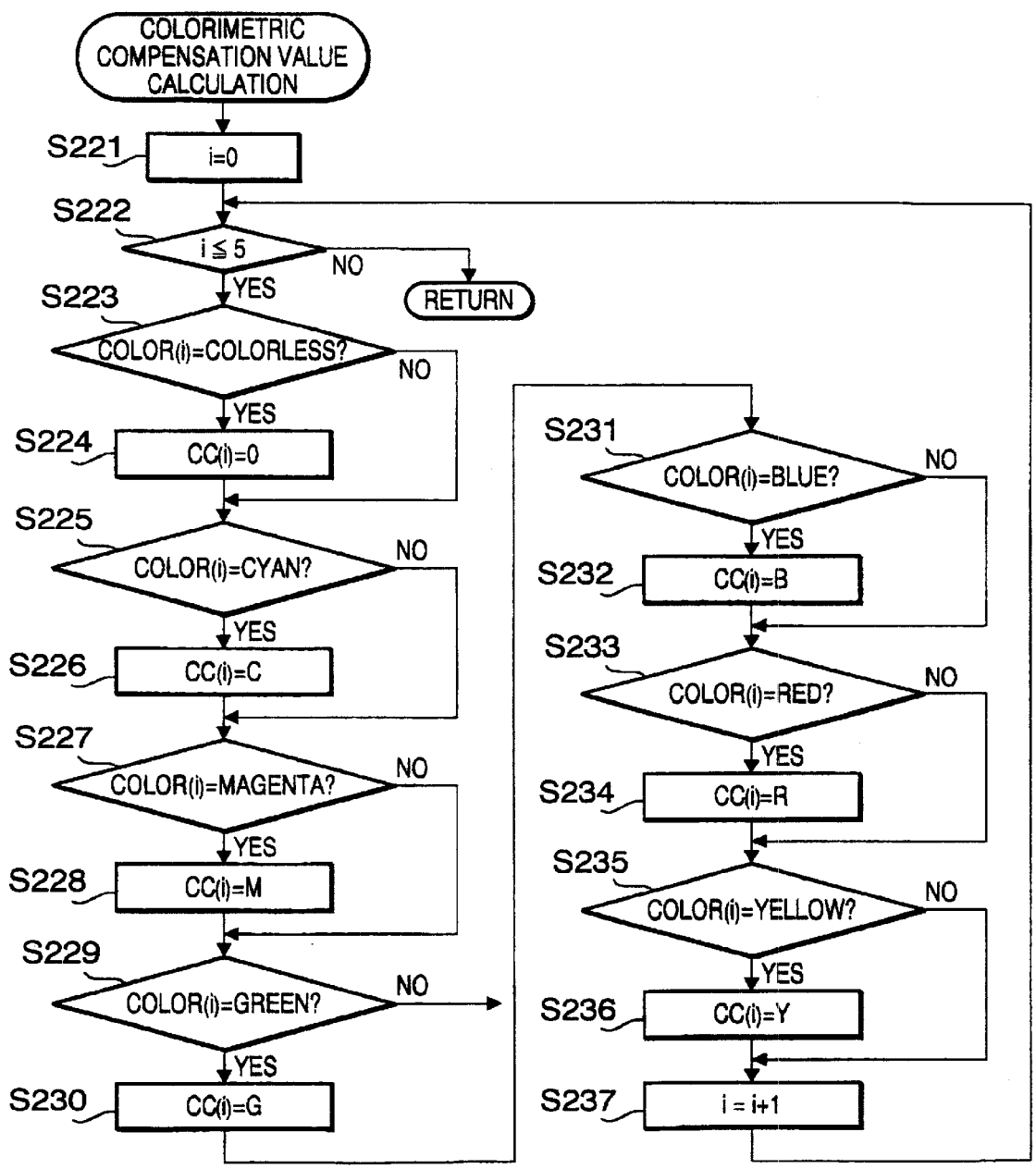
Figure 23:
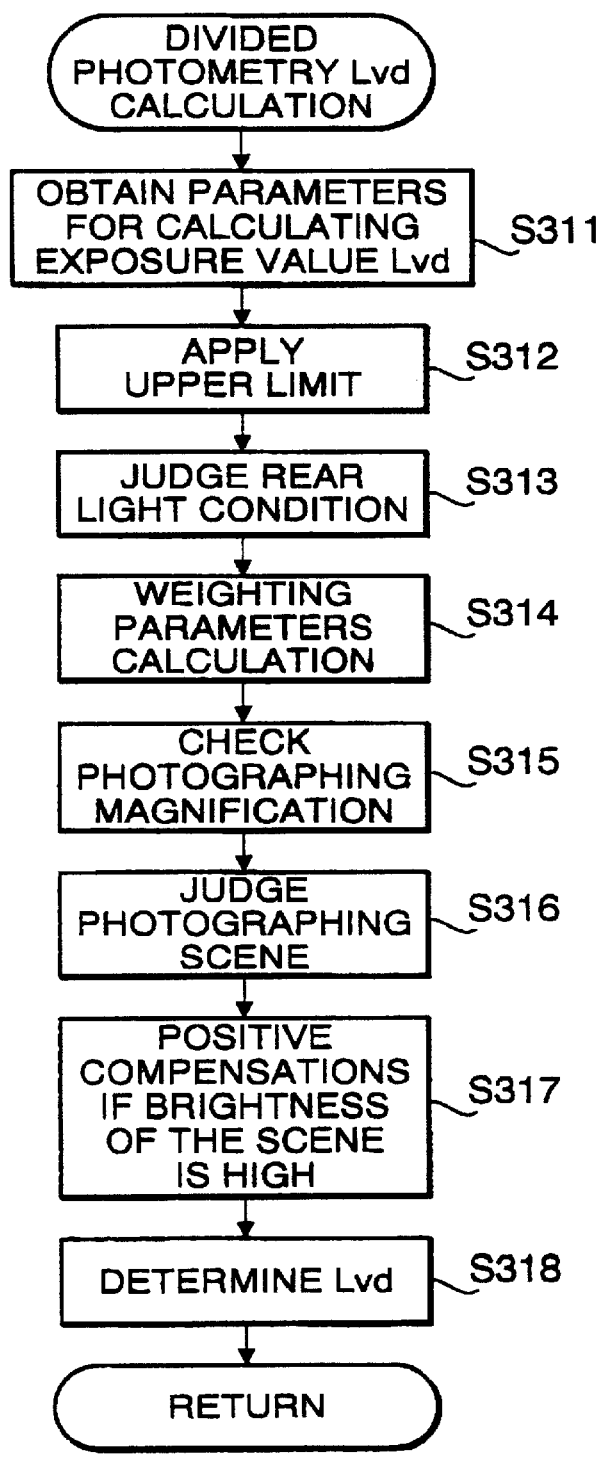

FIG. 4A schematically shows a structure of each of the photometry sensors;

FIG. 4B shows a relationship between the photometry areas of each photometry sensor;

FIG. 5 shows spectral sensitivity characteristics of the green, blue and red light sensors;

FIG. 6 shows a block diagram of main portions of the camera;

FIG. 7 is a flowchart illustrating a main procedure of a photometry operation according to an embodiment;

FIG. 8 is a flowchart illustrating the "lens communication procedure";

FIG. 9 shows a flowchart illustrating the "photometry sensor Bvd calculation procedure";

FIG. 10 is a flowchart illustrating the "open aperture photometry compensation calculation procedure";

FIG. 11 is a flowchart illustrating the "colorimetry procedure";

FIG. 12 is a flowchart illustrating the "light source compensation procedure";

FIG. 13 is a flowchart illustrating the "light source difference compensation procedure";

FIG. 14 is a flowchart illustrating the "colorimetric parameter calculation procedure";

FIG. 15 is a flowchart illustrating the "colorimetric constants setting procedure";

FIG. 16 shows an example of constants read from the EEPROM;

FIGS. 17 and 18 show a flowchart illustrating the "color judgment procedure";

FIG. 19 shows the "colorimetric compensation value calculation procedure";

FIG. 20 shows a relationship between types of compensation and figures illustrating the compensation methods;

FIG. 21 is a flowchart illustrating an "exposure value (Lvd) calculating procedure";

FIG. 22 is a flowchart illustrating an "exposure value determining procedure"; and FIG. 23 is a flowchart illustrating a "divided photometry Lvd calculation procedure."

DESCRIPTION OF THE EMBODIMENTS

Hereinafter, referring to the accompanying drawings, an embodiment according to the present invention will be described.

Figure 1:
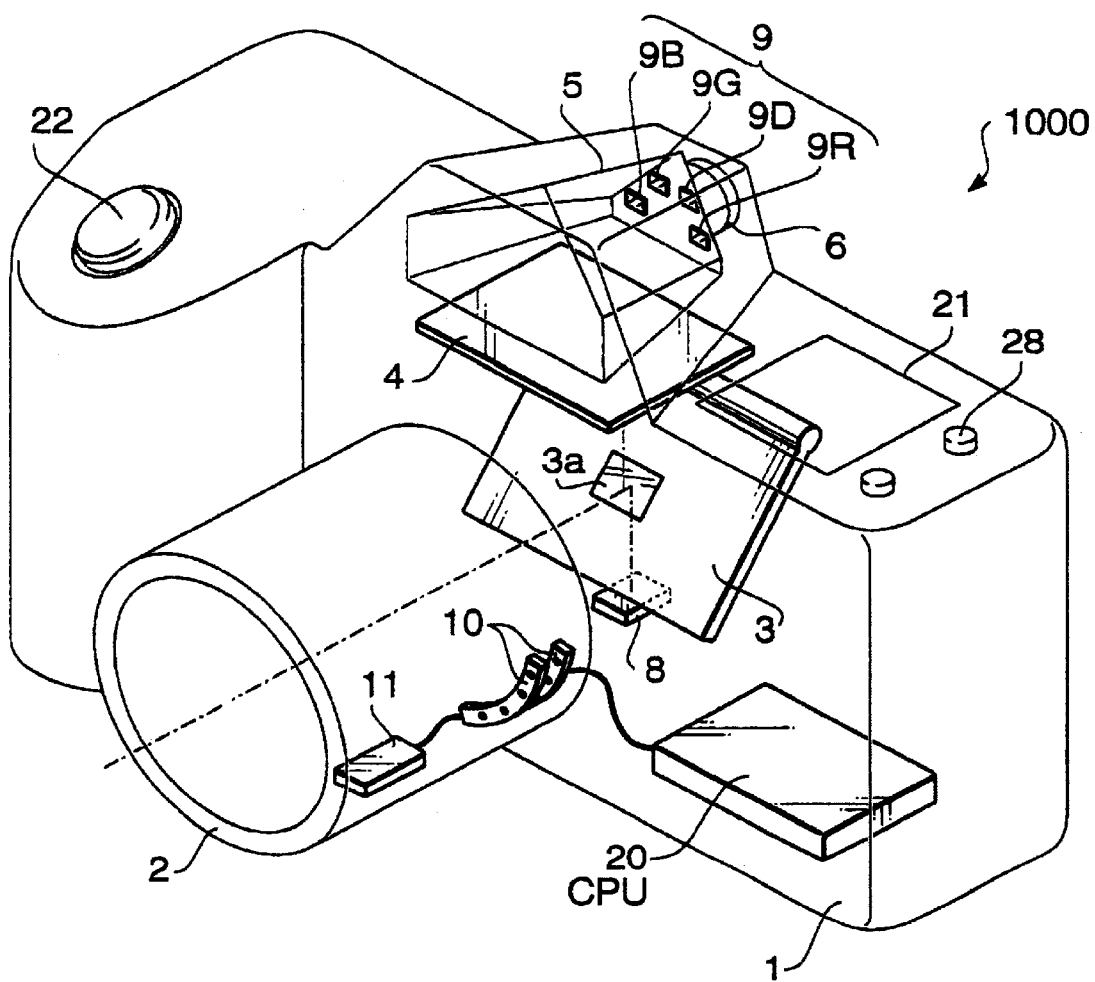
Figure 2:
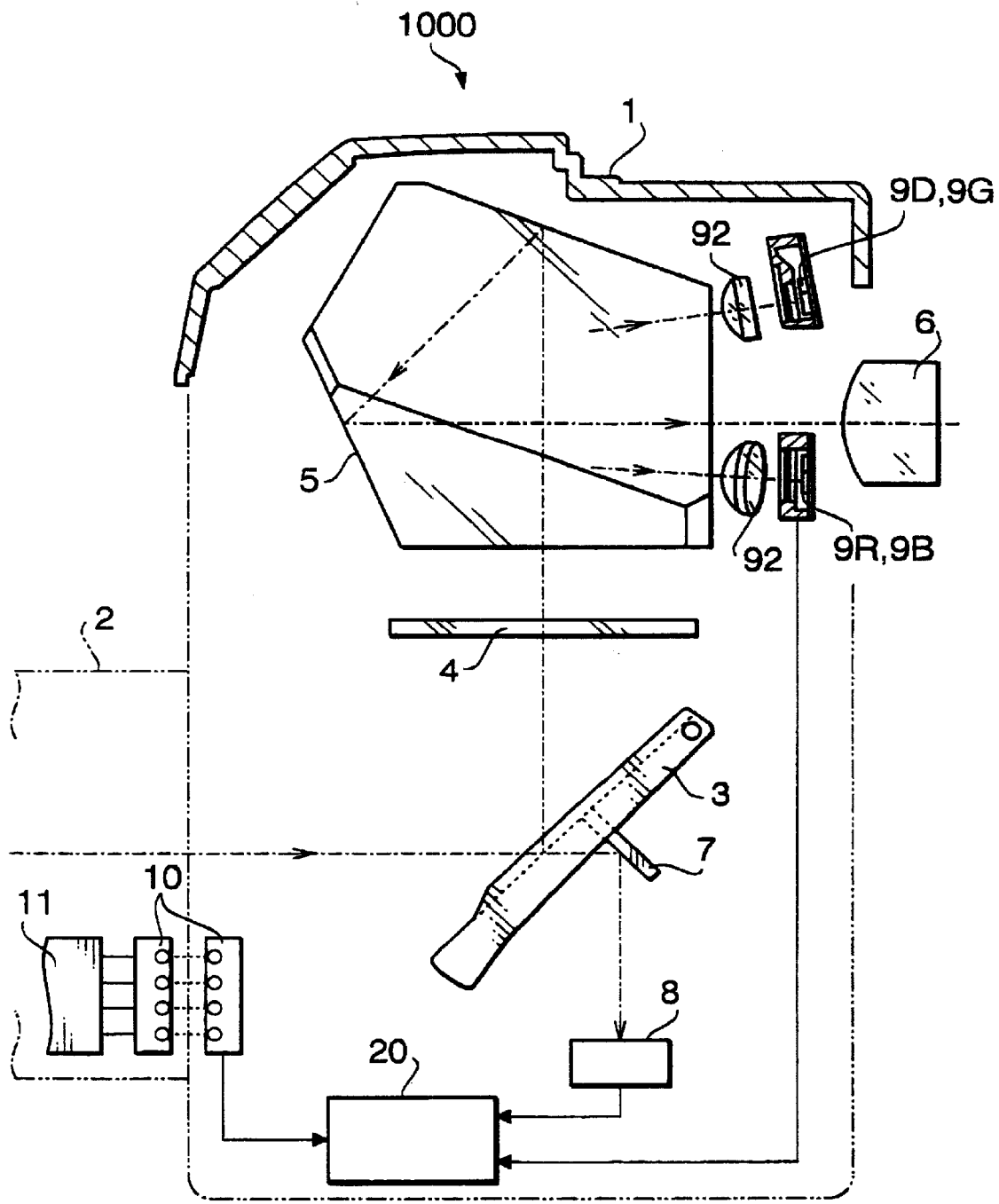

FIG. 1 shows a perspective view of a camera 1000 employing a photometry device according to the invention, and FIG. 2 schematically shows main components of the camera 1000.

The camera 1000 has a camera body 1, to which a photographing lens 2 is detachably coupled. The camera body 1 accommodates a quick return mirror 3, a focusing glass 4, a pentagonal prism 5 (or a pentagonal mirror), and an eyepiece optical system 6. A part of the quick return mirror 3 is formed to be a half mirror 3a (see FIG. 1), and behind the half mirror 3a, an auxiliary mirror 7 is provided. Light passed through the half mirror 3a is reflected by the auxiliary mirror 7, and is directed toward a distance measuring device 8. The distance measuring device 8 is configured as a multi-point distance measuring device, and an AF (Automatic focusing) control is performed in accordance with the measurement results of the distance measuring device 8.

On the rear side of the pentagonal prism 5, four photometry sensors 9 (9D, 9R, 9G and 9B) are provided (see FIGS. 1 and 2), each of which functions as a photometry element and receives part of light passed through the photographing lens 2. Based on the outputs of the photometry sensors 9, a photometry operation for determining exposure parameters is executed.

The photographing lens 2 and the camera body 1 are electrically connected through electrical contacts 10. Thus, a lens ROM 11 built in the photographing lens 2 is electrically connected to a control circuit 20 accommodated in the camera body 1. On an outer surface of the camera body 1, an LCD (liquid crystal display) 21, and various buttons such as a release button 22 and a photometry mode changeover switch 28 are provided. Furthermore, inside the camera body 1, various mechanisms such as a film winding mechanism are provided. However, such mechanisms are conventionally known, and description thereof will be omitted for the sake of simplicity.

Figure 3A:
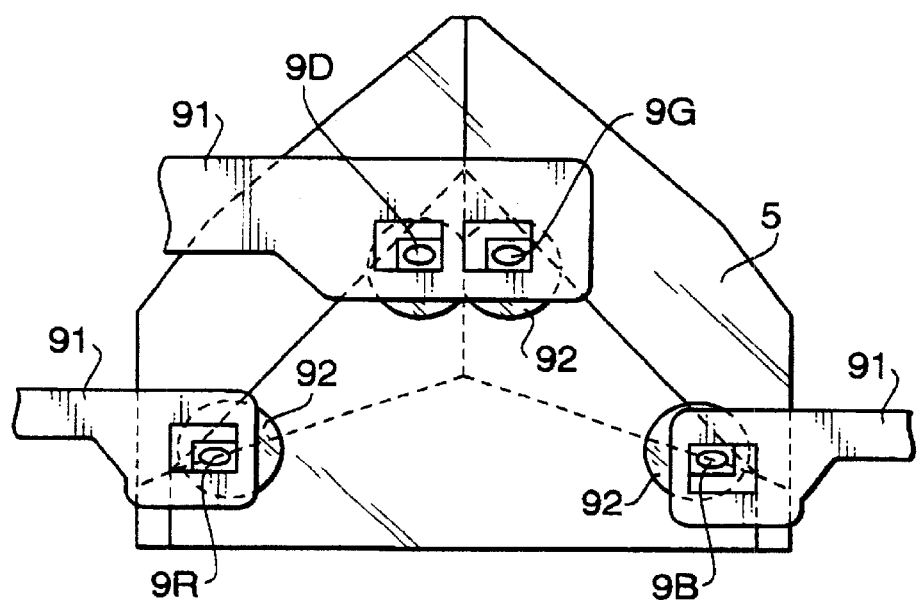
FIG. 3A shows an arrangement of photometry sensors.

FIG. 3A shows a rear view of the pentagonal prism 5. As shown in FIG. 3A, the four photometry sensors 9 includes sensors 9D and 9G provided at an upper central portion on the eyepiece side of the pentagonal prism 5, and sensors 9B and 9R are provided at lower side portions on the eyepiece side of the pentagonal prism 5. The photometry sensors 9D, 9G, 9B and 9R are mounted on an FPC (flexible printed circuit board) 91 and fixedly positioned at the above-described respective positions by the FPC 91. In front of (i.e., on the pentagonal prism side of) each of the photometry sensors 9D, 9G, 9B and 9R, an imaging lens 92 is provided to form an object image on each of the sensors 9D, 9G, 9B and 9R (see FIG. 2).

FIG. 4A schematically shows a structure of each of the sensors 9D, 9G, 9B and 9R. As shown in FIG. 4A, each sensor 9 (9D, 9G, 9B or 9R) is constructed as a planar structure photometry IC chip that is configured such that a light receiving section and an amplifier AMP are integrally formed. The light receiving section includes six photometry areas, i.e., a central area A0, a left area A1, a right area A2, an upper area A3, a lower area A4, and a peripheral area A5. FIG. 4B shows a relationship between the photometry areas A0–A5 and portions of an object. P0–P2 shown in the photometry areas A0–A2 represent distance measuring points, respectively. The photometry areas A0–A5 of each sensor receives the light from respective portions of an object as indicated in FIG. 4B.

The photometry sensor 9G is provided with a green filter GF on its light receiving surface, and receives a green component of light, the photometry sensor 9B is provided with a blue filter BF on its light receiving surface, and receives a blue component of light, and the photometry sensor 9R is provided with a red filter RF on its light receiving surface, and receives a red component of light. In this embodiment, the three sensors 9G, 9B and 9R are used as colorimetry elements. Spectral sensitivity characteristics of the sensors 9G, 9B and 9R respectively provided with the green, blue and red filters GF, BF and RF are indicated in FIG. 5. The sensors 9G, 9B and 9R have peaks in sensitivity at approximately 540 nm, 420 nm, and 620 nm, respectively.

The remaining sensor 9D is not provided with a color filter, but a sensitivity compensation filter is provided so that the spectral sensitivity characteristic of the sensor 9D has its peak within a wavelength range of 500–600 nm, which is close to the visual sensitivity characteristic. The sensor 9D is used as a normal light detecting sensor.

FIG. 6 shows a block diagram of main portions of the camera 1000. The four sensors 9D, 9G, 9B and 9R output values indicative of quantity of received light (components) to the controller 20, respectively. Further, the output (i.e., a distance value) of the distance measuring device 8 is transmitted to the controller 20, which controls the AF device 25 to perform the automatic focusing operation.

Furthermore, the controller 20 is connected with a photometry switch SWS and a shutter-release switch SWR. The photometry switch SWS is ON when the release button 22 is half depressed. The shutter-release switch SWR is ON when the shutter button is fully depressed. When the shutter button 22 is depressed halfway and the photometry switch SWS is turned ON, the controller 20 performs a photometry calculation in accordance with a predetermined algorithm, and calculates an exposure value. Then, the controller 20 controls the exposure control device 23 in accordance with the calculated exposure value to perform a photographing operation. Further, the controller 20 drives a display driver 24 to display the calculated exposure value on the LCD panel 21. It should be noted that the controller 20 includes an EEPROM 26 storing various values necessary for the photometry calculation (which will be described in detail later), and a RAM 27 for temporarily storing various pieces of data. Further to the above, when the exposure value is determined, a photometry mode signal indicative of one of photometry modes (e.g., area-divided photometry, averaged photometry, central area weighted photometry, a spot photometry and the like) is transmitted from the photometry mode changeover switch 28 to the controller 20.

An operation of the photometry device will be described hereinafter.

A procedure shown in FIG. 7 is a main procedure of a photometry operation. When the release button 22 is half depressed and the photometry switch SWS is ON (S11: YES), a "lens communication procedure" is performed (S12) so that the controller 20 receives data intrinsic to the photographing lens 2 currently mounted onto the camera body 1. Specifically, the data intrinsic to the photographing lens 2 includes an open f-number (full aperture), a focal length of the photographing lens 2, an exit pupil position and the like, which may affect the photometry calculation. The data is transmitted from a lens ROM 11 of the photographing lens 2 to the controller 20 through the electrical contacts 10. In S12A, a distance measuring operation is performed with respect to the distance measuring points P0–P2. Then, a "photometry sensor output Bvd calculation procedure" is executed (S13). In this procedure, the photometry sensors 9 (9D, 9G, 9B and 9R) output analog photometry values which are obtained by receiving light through the photographing lens 2, the quick return mirror 3, and the pentagonal prism 5. Then, the analog values are converted into digital brightness values Bvd which can be used in the operation executed by the controller 20.

It should be noted that the photometry is performed for each of the photometry areas A0–A5, and photometry values Bvd(i) (i being integers 0–5 corresponding to the photometry areas A0–A5). Then, using the photometry values Bvd(i) obtained in S13 and the data intrinsic to the photographing lens 2 obtained in S12, an "open aperture photometry compensation calculation procedure" is performed in S14, thereby individual photometry errors depending on the photographing lens 2 being canceled.

At S15, based on the brightness values Bvd(i) corresponding to the sensors 9R, 9B and 9G for the RGB (Red, Green and Blue) color components, a "colorimetry procedure" is executed to determine the color of an object for each of the photometry areas A0–A5. Then, for each of the photometry areas A0–A5, a colorimetric compensation value CC(i) is calculated based on the determined color of the object by executing an "colorimetric compensation value calculation procedure." In S17, an "exposure value calculating procedure" is executed, where the colorimetric compensation values CC(i) are added to the photometry values Bvd(i), respectively, and an exposure value Lvd for each of the photometry areas A0–A5 is obtained based on the compensated photometry values Bvd(i). In the exposure value calculation procedure (S17), in accordance with the photometry mode set by the photometry mode changeover switch 28, a calculation method is determined, and then, based on the photometry values Bvd(i), the exposure value Lvd is calculated using the determined calculation method.

At S18, if the shutter-release switch SWR is ON (S18: YES), the exposure control device 23 controls the exposure operation at S20 in accordance with the exposure value Lvd obtained at S17 to execute a photographing operation. If the shutter-release switch SWR is OFF, controls goes to S19, where it is detected whether a photometry timer is OFF.

If the photometry timer is ON (i.e., if a predetermined period has not elapsed)(S19: NO), control proceeds to S12, and the foregoing procedures are repeated. If the photometry timer is OFF (i.e., if the predetermined period has elapsed) (S19: YES), control proceeds to S11.

FIG. 8 is a flowchart illustrating the "lens communication procedure", which is called at S12 of the main procedure shown in FIG. 7.

In the lens communication procedure, the controller 20 accesses the lens ROM 11 through the electrical contacts 10, and retrieves the data intrinsic to the photographing lens 2 stored in the lens ROM 11 (S101). The retrieved data is stored in the RAM 27 of the controller 20, and control returns. Items included in the data intrinsic to the photographing lens 2 include, for example, a lens type, lens data, the shortest focusable distance, a focusable range, a focal length of the photographing lens, an exit pupil position, an open f-number, an aperture efficiency and the like. In this embodiment, the controller 20 reads at least the focal length, the exit pupil position, the open f-number and the aperture efficiency, and stores the data in the RAM 27.

FIG. 9 shows a flowchart illustrating the "photometry sensor Bvd calculation procedure", which is called at S13 in the main procedure shown in FIG. 7.

In this procedure, digital data values Bvad(i) (where, i=0, 1, ... , 5) which represents A/D converted output voltages (analog data) of the photometry areas Ai (i=0, 1, ... , 5) shown in FIG. 4A of the photometry sensor 9D for normal light are obtained. Further, data Bvad·g(i), Bvad·b(i) and Bvad·r(i) which represent A/D converted values of the output voltages of the photometry areas Ai (i=0, 1, 2, ... 5) of each of the sensors 9G, 9B and 9R for color components are obtained. Then, the A/D converted values Bvad(i) of the sensor 9D output are adjusted to brightness values Bvd(i) (S111). The A/D converted values Bvad·g(i), Bvad·b(i) and Bvad·r(i) (i=0, 1, 2, ... 5) are also adjusted to the brightness values Bvd·g(i), Bvd·b(i) and Bvd·r(i), respectively (S112). It should be noted that the A/D conversion method employed in S111 and S112 is a well-known method for converting a quantity of analogue value into digital data, and therefore, description thereof is not given herein.

FIG. 10 is a flowchart illustrating the "open aperture photometry compensation calculation procedure" which is called at S14 of the main procedure shown in FIG. 7.

At S121, an open aperture photometry compensation value Mnd1(i) is calculated based on the focal length, the exit pupil position, the open f-number and the aperture efficiency which have been retrieved from the ROM 11 and stored in the RAM 27.

The open aperture photometry compensation values Mnd1(i) are obtained as follows. Firstly, compensation values mv1, mv2, mv3 and mv4 for compensating for shift amounts with respect to the reference photometry values due to the individual differences of the optical characteristics of the cameras, and the focal length, the exit pupil position, the open f-number and the aperture efficiency, are determined. Then, the sum of the compensation values mv1+mv2+mv3+mv4 is obtained, which sum is referred to as the open aperture compensation value Mnd1(i). Similarly, corresponding to the photometry sensors 9G, 9B and 9R, the open aperture compensation values Mnd1·g(i), Mnd1·b(i), and Mnd1·r(i) are calculated. Then the open aperture compensation value Mnd1(i) is added to the brightness value Bvd(i), and then the sum is determined as a new brightness value Bvd(i). Thus, the following calculation is executed at S121:

$$Bvd(i)=Bvd(i)+Mnd1(i).$$

Similar to the above, with respect to the brightness values Bvd·g(i), Bvd·b(i) and Bvd·r(i) obtained by the photometry sensors 9G, 9B and 9R, open aperture photometry compensation values Mnd1·g(i), Mnd1·b(i) and Mnd1·r(i) are added to obtain newly defined brightness values (S122). That is:

$$Bvd·g(i)=Bvd·g(i)+Mnd1·g(i).$$

$$Bvd·b(i)=Bvd·b(i)+Mnd1·b(i).$$

$$Bvd·r(i)=Bvd·r(i)+Mnd1·r(i).$$

As a result, each brightness value is free from the affect of the individual differences of photographing lenses 2 coupled to the camera body 1.

At S15 of the main procedure shown in FIG. 7, a colorimetry procedure is called, which is shown in FIG. 11. In the "colorimetry procedure", the color of the object is detected, and in S16, the "colorimetry procedure" is called and colorimetric compensation values CC(i) are calculated in accordance with the detected color of the object.

FIG. 11 is a flowchart illustrating the "colorimetry procedure" called at S16 of the main procedure.

At S21, colorimetric parameters are initialized (i.e., set to initial values). At S22, a "light source compensation procedure" is executed to obtain compensation values for the effects of the color temperature of the light source. At S23, a "light source difference compensation procedure" is executed using the compensation values obtained at S22. At S24, a "colorimetric parameter calculation procedure" for obtaining colorimetric parameters, which will be used for execution of a "colorimetric judgment procedure", is executed. At S25, a "colorimetric constants setting procedure" is executed to set constants used for color measurement. At S26, a "color judgment procedure" for judging a color based on the parameters and constants obtained in the preceding steps is executed.

FIG. 12 shows a flowchart illustrating the "light source compensation procedures" called at S22 of FIG. 11.

In the embodiment, when the initial Bvd value of the photometry sensors 9 is determined, a predetermined light source (light source A) is used. When a photographing is to be executed, the Bvd should be compensated in accordance with the actually used light source, for example, the sunlight. In the procedure shown in FIG. 12, relative compensation values of B (blue) and R (red) components with respect to the value for the G (green) component are obtained, and the compensation is performed.

Specifically, for the color components G, B and R, the brightness data Bvd·light·g, Bvd·light·b, and Bvd·light·r, are retrieved from the EEPROM 26 (S141). Then, a light source adjustment value adj·sun·b for the photometry sensor 9B and a light source adjustment value adj·sun·r for the photometry sensor 9R with respect to the value for G component are retrieved from the EEPROM 26 (S142). The light source adjustment values are as follows.

$$adj\cdot sun\cdot b=+8$$

$$adj\cdot sun\cdot r=-4$$

It should be noted that, if the adjustment of the sensors 9 is executed using the sun light instead of the predetermined light source A, the light source adjustment values are all zero.

Then, based on the brightness data and the light source adjustment values, a light source compensation value light·gb for the photometry sensor 9B is obtained as follows (S143).

$$light\cdot gb=Bvd\cdot light\cdot g-Bvd\cdot light\cdot b+adj\cdot sun\cdot b$$

Similarly, a light source compensation value light·gr for the photometry sensor 9R is obtained as follows (S144).

$$light\cdot gr=Bvd\cdot light\cdot g-Bvd\cdot light\cdot r+adj\cdot sun\cdot r$$

FIG. 13 is a flowchart illustrating the "light source difference compensation procedure", which is called at S23 in FIG. 11. In this procedure, based on the light source compensation values for light·gb and light·gr, the light source compensation is applied to the brightness values Bvd·b(i) and Bvd·r(i) (i=0–5) obtained at areas A0–A5 of the photometry sensors 9B and 9R, respectively.

At S151, for each photometry area of the photometry sensor 9B, the following calculation is executed.

$$Bvd\cdot b(i)=Bvd\cdot b(i)+light\cdot gb.$$

At S152, for each photometry area of the photometry sensor 9R, the following calculation is executed.

$$Bvd\cdot r(i)=Bvd\cdot r(i)+light\cdot gr.$$

With the above compensation, the photometry sensors 9G, 9B and 9R has the same photometric characteristics for the external light source such as the sunlight.

FIG. 14 is a flowchart illustrating the "colorimetric parameter calculation procedure", which is called at S24 of FIG. 11. In this procedure, colorimetric parameters used in the colorimetric judging are calculated. As the colorimetric parameters, parameters Gf(i) for G component, parameters Bf(i) for B component, and parameters Rf(i) for R component are calculated (S161, S162 and S163) according to the following formulae.

$$Gf(i)=Bvd\cdot g(i)-\{Bvd\cdot b(i)+Bvd\cdot r(i)\}/2;$$

$$Bf(i)=Bvd\cdot b(i)-\{Bvd\cdot g(i)+Bvd\cdot r(i)\}/2;\text{ and}$$

$$Rf(i)=Bvd\cdot r(i)-\{Bvd\cdot b(i)+Bvd\cdot g(i)\}/2.$$

FIG. 15 is a flowchart illustrating the "colorimetric constants setting procedure", in which the colorimetric constants are retrieved from the EEPROM 26. The colorimetric constants include: threshold values for color judgment; coefficients for color judgment; coefficients for calculating colorimetric compensation values; and adjustment values for calculating the colorimetric compensation values, which are represented by valuables as indicated below:

threshold values for color judgment: THvalue·*1(i);

coefficients for color judgment: coefficient·#1(i) and coefficient·#2(i);

coefficients for calculating colorimetric compensation values: CCcoefficient·*1(i);

adjustment values for calculating the colorimetric compensation values: CCadjestment·*1(i).

In the above indication, a symbol * represents g (green), b (blue), r (red), m (magenta), y (yellow) or c (cyan), and a symbol # represents g (green), b (blue) or r (red).

In this procedure, for all the photometry areas A0–A5 of the sensors 9, the colorimetric constants are set, respectively. Therefore, at S171, i is set to zero (0), and then, if i≦5 (S172: YES), the constants are read from the EEPROM (S173, S174, S175 and S176). Then, at S177, i is incremented by one, and control returns to S172. Thus, for i=0 through 5, steps S173–S176 are repeated. The constants read from the EEPROM 26 are stored in the RAM 27 of the controller 20. FIG. 16 shows an example of the constants read from the EEPROM 26.

FIGS. 17 and 18 show a flowchart illustrating the "color judgment procedure". The procedure judges the color of the object for each photometry area A0–A5.

At S181, i is set to 0. Then, if i≦5 (S182: YES), the following steps are repeated. In the following description. Color(i) represents color parameters, and Color·max(i) and Color·min(i) represent color judgment parameters.

At S183, the color parameter Color(i) is set to colorless. Then, at S184, Rf(i) and THvalue·c1(i) are compared.

If Rf(i)<THvalue·c1(i) (S184:YES), |Bf(i)−Gf(i)| and |coefficient·r1(i)×Rf(i)| are compared (S185).

If |Bf(i)−Gf(i)|<|coefficient·r1(i)×Rf(i)| (S185:YES), Color·min(i) is set to Rf(i) (S186).

If Rf(i)≧THvalue·c1(i) (S184:NO) or |Bf(i)−Gf(i)|≧|coefficient·r1(i)×Rf(i)| (S185:NO), step S186 is skipped.

At S187, Gf(i) is compared with THvalue·m1(i).

If Gf(i)<THvalue·m1(i) (S187:YES), |Bf(i)−Rf(i)| and |coefficient·g1(i)×Gf(i)| are compared (S188).

If |Bf(i)−Rf(i)|<|coefficient·g1(i)×Gf(i)| (S188:YES), Color·min(i) is set to Gf(i) (S189).

If Gf(i)≧THvalue·m1(i) (S187:NO) or |Bf(i)−Rf(i)|≧|coefficient·g1(i)×Gf(i)| (S188:NO), step S189 is skipped.

At S190, Gf(i) is compared with THvalue·g1(i).

If Gf(i)>THvalue·g1(i) (S190:YES), |Bf(i)−Rf(i)| and |coefficient·g2(i)×Gf(i)| are compared (S191).

If |Bf(i)−Rf(i)|<|coefficient·g2(i)×Gf(i)| (S191:YES), Color·max(i) is set to Gf(i) (S192).

If Gf(i)≦THvalue·g1(i) (S190:NO) or |Bf(i)−Rf(i)|≧|coefficient·g2(i)×Gf(i)| (S191:NO), step S192 is skipped.

At S193, Bf(i) is compared with THvalue·b1(i).

If Bf(i)>THvalue·b1(i) (S193:YES), |Gf(i)−Rf(i)| and |coefficient·b2(i)×Bf(i)| are compared (S194).

If |Gf(i)−Rf(i)|<|coefficient·b2(i)×Bf(i)| (S194:YES), Color·max(i) is set to Bf(i) (S195). If Bf(i)≦THvalue·b1(i) (S193:NO) or |Gf(i)−Rf(i)|≧|coefficient·b2(i)×Bf(i)| (S194:NO), step S195 is skipped.

At S196, Rf(i) is compared with THvalue·r1(i).

If Rf(i)>THvalue·r1(i) (S196:YES), |Bf(i)−Gf(i)| and |coefficient·r2(i)×Rf(i)| are compared (S197).

If |Bf(i)−Gf(i)|<|coefficient·r2(i)×Rf(i)| (S197:YES), Color·max(i) is set to Rf(i) (S198). If Rf(i)≦THvalue·r1(i) (S196:NO) or |Bf(i)−Gf(i)|≧|coefficient·r2(i)×Rf(i)| (S197:NO), step S198 is skipped.

At S199, Bf(i) is compared with THvalue·y1(i).

If Bf(i)<THvalue·y1(i) (S199:YES), |Gf(i)−Rf(i)| and |coefficient·b1(i)×Bf(i)| are compared (S200).

If |Gf(i)−Rf(i)|<|coefficient·b1(i)×Bf(i)| (S200:YES), Color·min(i) is set to Bf(i) (S201). If Bf(i)≧THvalue·y1(i) (S199:NO) or |Gf(i)−Rf(i)|≧|coefficient·b1(i)×Bf(i)| (S200:NO), step S201 is skipped.

During the above steps, for each of the photometry areas A0–A5, color·max(i) and color·min(i) are obtained.

At S202 (FIG. 18), it is jedged whether color·min(i) is equal to Rf(i). If color·min(i) is equal to Rf(i) (S202:YES), color(i) is set to cyan (S203). If color·min(i) is not equal to Rf(i), S203 is skipped. Then, it is judged whether color·min (i) is equal to Gf(i) at S204. If color·min(i) is equal to Gf(i) (S204:YES), color(i) is set to magenta (S205). If color·min (i) is not equal to Gf(i), S205 is skipped. Next, it is judged whether color·max(i) is equal to Gf(i) at S206. If color·max (i) is equal to Gf(i) (S206:YES), color(i) is set to green (S207). If color·max(i) is not equal to Gf(i) (S206:NO), S207 is skipped. In S208, it is judged whether color·max(i) is equal to Bf(i). If color·max(i) is equal to Bf(i), color(i) is set to blue (S209). If color·max(i) is not equal to Bf(i) (S208:NO), then S209 is skipped. In S210, it is judged whether color·max(i) is equal to Rf(i). If color·max(i) is equal to Rf(i) (S210:YES), then color(i) is set to red (S211). If color·max(i) is not equal to Rf(i) (S210:NO), S211 is skipped. In S212, it is judged whether color·min(i) is equal to Bf(i). If color·min(i) is equal to Bf(i) (S212:YES), color(i) is set to yellow (S213), and control proceeds to S214. If color·min(i) is not equal to Bf (i) (S212:NO), step S213 is skipped, and control proceeds to S214, where i is incremented by one. Then, control proceeds to S182. As a result of the above-described procedure, yellow has the highest priority, and in the foregoing steps, the color finally selected in accordance with the conditions is determined as the color of the photometry area. Since the above procedure is repeated for i=0 to i=5, the color of each of the photometry areas A0–A5 is determined.

After the color judgment is performed as described above, the "colorimetric compensation value calculation procedure" as shown in FIG. 19 is called at S16 of the flowchart shown in FIG. 7.

In this procedure, the colorimetric compensation values CC(i) corresponding to the difference of the colors among the photometry areas are calculated.

At S221, i is set to an initial value of zero. At S222, it is judged whether i is equal to or smaller than five, or greater than five. If i is 0, 1, 2, 3, 4 or 5, (S222:YES), it is judged whether color(i) is colorless (S223). If color(i) is colorless (S223:YES), CC(i) is set to zero (S224). If color(i) is not colorless (S223:NO), step S224 is skipped. At S225, it is judged whether color(i) is cyan. If color(i) is cyan (S225:YES), the colorimetric compensation value CC(i) is set to C in S226. If color(i) is not cyan (S225:NO), then step S226 is skipped.

At S227, it is judged whether color(i) is magenta. If color(i) is magenta (S227:YES), the colorimetric compensation value CC(i) is set to M in S228. If color(l) is not magenta (S227:NO), then step S228 is skipped.

At S229, it is judged whether color(i) is green. If color(i) is green (S229:YES), the colorimetric compensation value CC(i) is set to G in S230. If color(i) is not green (S229:NO), then step S230 is skipped.

At S231, it is judged whether color(i) is blue. If color(i) is blue (S231: YES), the colorimetric compensation value CC(i) is set to B in S232. If color(i) is not blue (S231:NO), then step S232 is skipped.

At S233, it is judged whether color(i) is red. If color(i) is red (S233:YES), the colorimetric compensation value CC(i) is set to R in S234. If color(i) is not red (S233:NO), then step S234 is skipped.

At S235, it is judged whether color(i) is yellow. If color(i) is yellow (S235:YES), the colorimetric compensation value CC(i) is set to Y in S236. If color(i) is not yellow (S235:NO), then step S236 is skipped. Then, at S237, i is incremented by one, and control returns to S222. By the above procedures for i=0 to i=5, each of the colorimetric compensation values CC(i) is set to Y, M, C, B, G or R.

In the following procedure, for the determined values of Y, M, C, B, G or R for each of the colorimetric compensation values CC(i), a numerical value is assigned to obtain a numerical value of the colorimetric compensation value CC(i). FIG. 20 shows a relationship of conditions (A) through (E) for compensation, and TABLEs indicating the numerical values.

As understood from FIG. 20, there are conditions in which the compensation of the colorimetric compensation values is performed or not. The latter condition is indicated as condition (A) in FIG. 20. The former is further divided into four conditions, which include: condition (B) where the colorimetric compensation values, which are modified in accordance with a distance from the center of the photographing frame, are selected, or the colorimetric compensation values are calculated in accordance with a distance from the center of the photographing frame; condition (C) where the colorimetric compensation values, which are modified in accordance with the data intrinsic to the photographing lens, are selected; condition (D) where the colorimetric compensation values are calculated in accordance with the data intrinsic to the photographing lens; and condition (E) where the colorimetric compensation values, which are modified in accordance with the focusing condition data, are selected.

TABLE 1 shows the colorimetric compensation values corresponding to the symbols Y, M, C, B, G and R, which are stored in the EEPROM 27.

TABLE 1

| Symbol | colorimetric compensation value |
|--------|-------------------------------|
| Y      | −8                            |
| M      | 0                             |
| C      | 0                             |
| B      | +6                            |
| G      | 0                             |
| R      | +2                            |

It should be noted that the values shown in TABLE 1 are default values, which are used when the modification or calculation as in conditions (B)–(E) will not be performed.

TABLE 2 indicates the colorimetric compensation values which are modified in accordance with the distance with respect to the center of the photographing frame. The values indicated in TABLE 2 are stored in the EEPROM 27.

TABLE 2

| | colorimetric compensation values | | |
|--------|----------------|------------------|------------|
| Symbol | $0 \leq Yd < 2.5$ | $2.5 \leq Yd < 8.5$ | $8.5 \leq Yd$ |
| Y      | −8             | −4               | −2         |
| M      | 0              | 0                | 0          |
| C      | 0              | 0                | 0          |
| B      | +6             | +3               | +1         |
| G      | 0              | 0                | 0          |
| R      | +2             | +1               | 0          |

A relationship between the photometry areas A0–A5 and the distance Yd from the center of the photographing frame is indicated in TABLES 3 and 4. The relationship shown in TABLEs 3 and 4 is stored in the EEPROM 27.

TABLE 3

| Yd (mm) | photometry area |
|---|---|
| longer side | |
| 0 ≤ Yd ≤ 2.5 | A0 |
| 2.5 ≤ Yd < 8.5 | A1, A2 |
| 8.5 ≤ Yd | A5 |

TABLE 4

| Yd (mm) | photometry area |
|---|---|
| shorter side | |
| 0 ≤ Yd ≤ 2.5 | A0 |
| 2.5 ≤ Yd < 5.6 | A3, A4 |
| 5.6 ≤ Yd | A5 |

It should be noted that, for the photometry area A5, the value in TABLE 3 or TABLE 4 is selected depending on the side along which the image is formed.

When the colorimetric compensation value is assigned to each photometry area A(i), the distance Yd is determined based on TABLEs 3 and 4, and then an appropriate value indicated in TABLE 2 is selected.

TABLE 5 indicates alternative modification of the colorimetric compensation values which may also be stored in the EEPROM 27. In TABLE 5, the colorimetric compensation values are provided by a function of Yd.

TABLE 5

| Symbol | colorimetric compensation values |
|---|---|
| Y | Yd − 10 (Y ≤ 0) |
| M | 0 |
| C | 0 |
| B | −Yd/2 + 6 (B ≥ 0) |
| G | 0 |
| R | −Yd/3 + 3 (R ≥ 0) |

In the embodiment, the amount (i.e., the absolute value) of the colorimetric compensation value is smaller for a farther point. For example, in TABLE 2, the value of Y is −8 for 0≤Yd<2.5, is −4 for 2.5≤Yd<8.5, and is −2 for 8.5<Yd. Further, the values for M, C and R are fixed to zero.

TABLE 6 shows the colorimetric compensation values for condition (C). In this example, as the data intrinsic to the photographing lens 2, the exit pupil position, the open f-number, and the focal length are referred to. Depending on the data intrinsic to the photographing lens, one of columns A, B and C in TABLE 6 is selected.

TABLE 6

| Symbol | colorimetric compensation values | | |
|---|---|---|---|
| | A | B | C |
| Y | −8 | −4 | −2 |
| M | 0 | 0 | 0 |
| C | 0 | 0 | 0 |
| B | +6 | +3 | +1 |
| G | 0 | 0 | 0 |
| R | +2 | +1 | 0 |

TABLEs 7–9 show which of the columns A–C of TABLE 6 is to be selected depending on the exit pupil, open f-number and focal length, respectively. The conditions indicated in TABLEs 7–9 are stored in the EEPROM 26.

TABLE 7

| Exit Pupil position (1/Exp) | selected column |
|---|---|
| Exitp < 40 | C |
| 40 ≤ Exitp < 60 | B |
| 60 ≤ Exitp < 120 | A |
| 120 ≤ Exitp < 200 | B |
| 200 ≤ Exitp | C |

TABLE 8

| Open f-number | selected column |
|---|---|
| Avmin < 1.5 | C |
| 1.5 ≤ Avmin < 2.5 | B |
| 2.5 ≤ Avmin < 3.5 | A |
| 3.5 ≤ Avmin < 4.5 | B |
| 4.5 ≤ Avmin | C |

TABLE 9

| Focal Length (mm) | selected column |
|---|---|
| FL < 24 | C |
| 24 ≤ FL < 40 | B |
| 40 ≤ FL < 100 | A |
| 100 ≤ FL < 300 | B |
| 300 ≤ FL | C |

As understood from the TABLEs 6–9, values for M, C and G are set to a fixed value of zero. For Y, B and R, when the exit pupil position, the open f-number or the focal length has a central value, colorimetric compensation values having the greatest absolute values are selected, and when the exit pupil position, the open f-number or the focal length decreases or increased with respect to the central value, the colorimetric compensation values having smaller absolute values are selected.

TABLEs 10–12 show the colorimetric compensation values for condition (D). In this example, as the data intrinsic to the photographing lens 2, the exit pupil position, the open f-number, and the focal length are referred to. Depending on the data intrinsic to the photographing lens, the colorimetric compensation values are calculated. It should be noted that the coefficients of the formulae shown in TABLEs 10–12 are stored in the EEPROM 26.

TABLE 10 shows a relationship between the colorimetric compensation values and the exit pupil position Exitp. As indicated in TABLE 10, depending on whether the exit pupil position is greater than 80 or not, Y, B and R are calculated in accordance with different formulae. The values for M, C and G are fixed to zero.

TABLE 10

| | colorimetric compensation value | |
|---|---|---|
| Symbol | Exitp ≤ 80 | 80 < Exitp |
| Y | −0.1 × Exitp (Y ≤ 0) | 0.05 × Exit − 12 (Y ≤ 0) |
| M | 0 | 0 |
| C | 0 | 0 |
| B | 0.1 × Exitp − 2 (B ≥ 0) | −0.05 × Exitp + 10 (B ≥ 0) |

TABLE 10-continued

| | colorimetric compensation value | |
|---|---|---|
| Symbol | Exitp ≦ 80 | 80 < Exitp |
| G | 0 | 0 |
| R | 0.05 × Exitp − 2 (R ≧ 0) | −0.05 × Exitp + 6 (R ≧ 0) |

TABLE 11 shows a relationship between the colorimetric compensation values and the open f-number Avmin. As indicated in TABLE 11, depending on whether the Avmin is greater than 3 or not, Y, B and R are calculated in accordance with different formulae. The value for M, C and G are fixed to zero.

TABLE 11

| | colorimetric compensation value | |
|---|---|---|
| Symbol | Avmin ≦ 3 | 3 < Avmin |
| Y | −2 × Avmin − 2 (Y ≦ 0) | 2 × Avmin − 14 (Y ≦ 0) |
| M | 0 | 0 |
| C | 0 | 0 |
| B | 2 × Avmin (B ≧ 0) | −2 × Avmin + 12 (B > 0) |
| G | 0 | 0 |
| R | Avmin − 1 (R ≧ 0) | −1 × Avmin + 5 (R ≧ 0) |

TABLE 12 shows a relationship between the colorimetric compensation values and the focal length FL. As indicated in TABLE 12, depending on whether FL is greater than 50 or not, Y, B and R are calculated in accordance with different formulae. The values for M, C and G are fixed to zero.

TABLE 12

| | colorimetric compensation value | |
|---|---|---|
| Symbol | FL ≦ 50 | 50 < FL |
| Y | −0.15 × FL − 0.5 (Y ≦ 0) | 0.05 × FL − 10.5 (Y ≦ 0) |
| M | 0 | 0 |
| C | 0 | 0 |
| B | 0.1 × FL + 1 (B ≧ 0) | −0.05 × FL + 8.5 (B > 0) |
| G | 0 | 0 |
| R | 0.05 × FL − 0.5 (R ≧ 0) | −0.05 × FL + 4.5 (R ≧ 0) |

It should be noted that the values calculated in accordance with the above formulae are close to the values obtained in accordance with condition (C) with reference to TABLE 6.

TABLE 13 shows the colorimetric compensation values for condition (E). In this example, depending on the focusing condition, the colorimetric compensation values are selected. It should be noted that the coefficients of the values shown in TABLE 13 are stored in the EEPROM 26.

In the camera according to the embodiment, distance measuring points P0, P1 and P3 are provided, which correspond to the photometry areas A0, A1 and A2. In TABLE 13, depending on whether the photometry areas A0, A1 and A2 are focused or not, the colorimetric compensation values for Y, B and R are selected. The values for M, C and G are fixed to zero.

TABLE 13

| | colorimetric compensation value | | | |
|---|---|---|---|---|
| | area A0 | | areas A1 and A2 | |
| Symbol | focused | not focused | focused | Not focused |
| Y | −8 | −4 | −6 | −2 |
| M | 0 | 0 | 0 | 0 |
| C | 0 | 0 | 0 | 0 |
| B | +6 | +3 | +4 | +2 |
| G | 0 | 0 | 0 | 0 |
| R | +2 | +1 | +1 | +1 |

As understood from TABLE 13, the colorimetric compensation values for Y, B and R are smaller when the areas A1 and A2 are focused than a case where the area A0 is focused. The colorimetric compensation values for M, C and G are fixed to zero.

After the color compensation values CC(i) are set as described above (S16 in FIG. 7), an "exposure value calculation procedure" is executed.

FIG. 21 is a flowchart illustrating the "exposure value calculating procedure", which is called at S17 of the main procedure shown in FIG. 7. The "exposure value calculation procedure" is a procedure for obtaining a suitable exposure value Lvd by applying compensation based on a photographing condition to the brightness values Bvd(i) for the photometry areas A0–A5 of the normal light sensor 9D, which are obtained in S13 and compensated in S14 (FIG. 7). Specifically, in this procedure, for example, by comparing the brightness values Bvd(i) with each other or by evaluating the brightness values Bvd(i) as a whole, a photographing conditions, e.g., a rear light photographing, a magnification and/or scene of photographing, is judged. Then, based on the photographing condition as judged, the exposure value Lvd is calculated by applying a predetermined algorithm with respect to the brightness values Bvd(i). For example, the exposure value Lvd suitable to the photographing condition may be determined by weighted-averaging the brightness values Bvd(i), or by selecting one of the brightness values Bvd(i).

In S131, a colorimetric compensation calculation is executed. In the colorimetric compensation calculation, colorimetric compensation values CC(i) for the photometry areas A0–A5 are added to the brightness values Bvd(i) for the photometry areas A0–A5, respectively, to obtain the compensated brightness values Bvd(i). That is:

$$Bvd(i)=Bvd(i)+CC(i)$$

Then, in accordance with the setting of the photometry mode selection switch 28, a photometry mode flag is set (S132). At S133, an "exposure value calculation procedure" is executed to calculate the exposure value Lvd in accordance with the photometry mode represented by the photometry mode flag.

FIG. 22 shows a flowchart illustrating the "exposure value calculation procedures" which is called at S133 of the flowchart shown in FIG. 21.

In S301, the photometry mode flag is checked. Depending on the photometry mode flag, control diverges to one of S302, S303, S304 and S305. Specifically, when the photometry mode flag represents the divided photometry, control proceeds to S302 and a divided-photometry exposure value Lvd is calculated. If the photometry mode flag represents the averaging photometry, control proceeds to S303 and an averaged-photometry exposure value Lvd is calculated. If the photometry mode flag represents the center-weighted photometry, control proceeds to S304 and a center-weighted photometry exposure value Lvd is calculated. If the photometry mode flag represents the spot photometry, control proceeds to S305 and a spot photometry exposure value Lvd is calculated.

FIG. 23 shows a flowchart illustrating a "divided-photometry exposure value calculation procedure", in which the exposure value Lvd is determined based on the compensated brightness values Bvd(i). Firstly, based on the compensated brightness values Bvd(i) for the photometry areas A0–A5 of the sensor 9D, parameters for calculating the exposure value Lvd is obtained (S311). Then, the parameters are compensated based on an upper limit of the brightness (S312), a rear light condition (S313), weighted parameter calculation (S314), a photographing magnification (S315), a photographing scene (S316) a positive compensation for the high brightness photographing scene (S317). Then, based on the compensated parameters, the exposure value Lvd is obtained (S318).

When the averaged-photometry exposure value is obtained at S303 of FIG. 22, the exposure value Lvd is calculated merely by averaging the brightness values Bvd(i) as follows:

$$Lvd=\{Bvd(0)+Bvd(1)+Bvd(2)+Bvd(3)+Bvd(4)+Bvd(5)\}/6$$

When the center-weighted exposure value is obtained at S304 of FIG. 22, the exposure value Lvd is calculated based on the following formula:

$$Lvd=\{(Bvd(0)\times 4)+Bvd(5)+(Bvd(1)+Bvd(2)+Bvd(3)+Bvd(4))\times/4\}/8$$

When the spot-photometry exposure value is obtained at S305 of FIG. 22, the maximum value of the brightness values Bvd(i) is selected. That is:

$$Lvd=max\ \{Bvd(0),\ Bvd(1),\ Bvd(2),\ Bvd(3),\ Bvd(4),\ Bvd(5)\}$$

Alternatively, the brightness value Bvd(0) of the central photometry area A0 may be used as the exposure value Lvd.

If the thus calculated exposure value Lvd is input to a not-shown exposure control device, which controls the exposure operation of the camera, an object can be photographed at an appropriate exposure value regardless of the difference of colors (i.e., the difference of the reflectivity).

Specifically, when the object color is determined to be yellow, the exposure compensation value is determined so that the object is overexposed, and when the object color is determined to be blue or red, the exposure compensation value is determined so that the object is underexposed. Thus, the difference of reflectivity depending on the color of the object can be resolved, and an appropriate exposure can be performed.

According to the above-described embodiment, each of the photometry sensor for the normal light, and those for the colorimetry has a plurality of photometry areas, and the exposure value is calculated based on the compensated photometry values. In particular, the colorimetric compensation value obtained by the colorimetric judgment in each photometry area is modified depending on the distance from the center of the photographing frame, the exit pupil position, the open f-number, the focal length, the photographing condition at a photometry area corresponding to the distance measuring area.

With this configuration, the colorimetric compensation values of yellow, blue and red, which greatly affects the exposure value, are modified such that, for example, the colorimetric compensation values at the peripheral areas are smaller that those at the central areas, thereby the effects of the color of an object located at the peripheral portion of the photographing frame are reduced, and a central part of the object is appropriately exposed. Thus, the effects of the erroneous compensation due to the inferior photometry accuracy at the peripheral portion are eliminated with this configuration. It should be noted that, in the above-described embodiment, compensation corresponding to the G, M and C components are not provided since these components have less effect to the exposure value.

In the above-described embodiment, as shown in FIG. 3A, the sensor 9D for the normal light is arranged at an upper central potion on the eyepiece side of the pentagonal prism 5. Thus, with respect to the object, the sensor 9D for the normal light is arranged at the symmetrically central position. Therefore, it becomes possible to set the photometry sensitivity distribution of the sensor 9D is made symmetrically with respect to the center thereof, and obtain high photometry accuracy at the central area of the pentagonal prism 5, which area has a higher priority in photometry operation. That is, at the center of the pentagonal prism 5, a difference of angles formed between the optical axis of the photographing lens 2 and the optical axis of the eyepiece optical system 5 can be made small. Therefore, a substantially all the photographing angle range can be covered using the sensor 9D for the normal light.

Figure 3B:
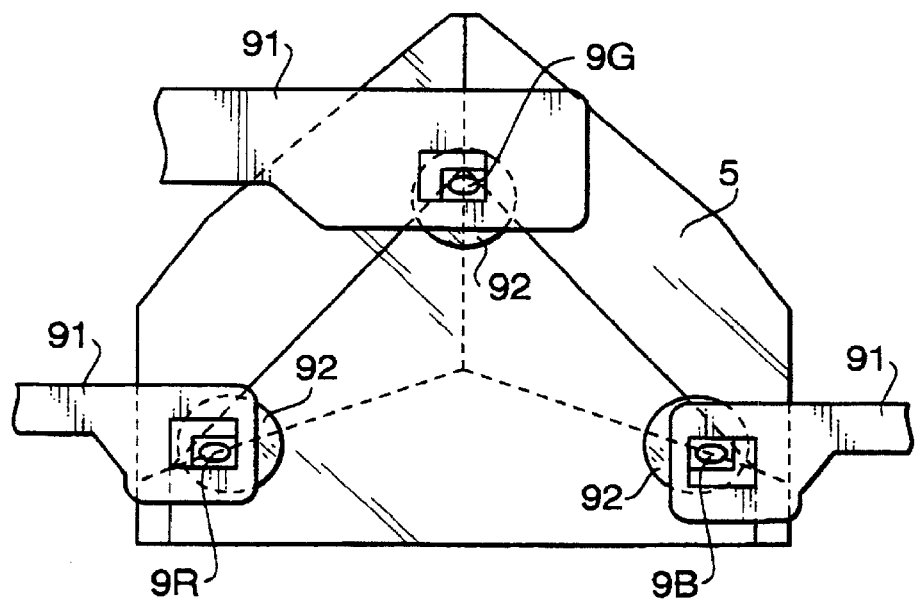
FIG. 3B shows an alternative arrangement of photometry sensors.

In the above-described embodiment, the sensor 9D for the normal light is provided in addition to the sensors 9B, 9G and 9R for B, G and R color components. The light receiving characteristics of the sensor G has a peak at the wavelength of 540 nm. This characteristic is close to that of the sensor 9D. Therefore, in another embodiment of the invention, the sensor 9G is used instead of the sensor 9D, and the sensor 9D is omitted, as shown in FIG. 3B. In such a case, in steps S11–S15 of the main procedure (FIG. 7), the output Bvad·g of the sensor 9G is used as Bvad, and the calculation is to be executed.

With this configuration, the photometry device includes only three photometry sensors. Since the number of the sensors is reduced, such a structure contributes to reduction of the manufacturing cost. Further, the omission of one sensor contributes to the downsizing of the camera body. It should be noted that, in FIG. 3B, the photometry sensor 9G is located at an upper central position on the eyepiece side of the pentagonal prism 5 as the normal light photometry sensor 9D in FIG. 3A. With this structure, the photometry sensitivity distribution can be made symmetrical with respect to the center thereof, thereby the accuracy of the photometry sensor 9G can be improved.

The present disclosure relates to the subject matter contained in Japanese Patent Application No. 2000-350732, filed on Nov. 17, 2000, which is expressly incorporated herein by reference in its entirety.

What is claimed is:

1. A photometry device for a camera, comprising:
   a normal light sensor that has a plurality of photometry areas and performs a photometry operation with respect to an object at each of said plurality of photometry areas, said normal light sensor having a spectral sensitive characteristics close to those of a human eye;
   a plurality of colorimetric sensors for colorimetry capable of performing photometry with respect to each of said plurality of photometry areas, said plurality of colorimetric sensors having different spectral sensitivity characteristics;
   a photometry value determining system that determines an photometry value at each of said plurality of photometry areas in accordance with outputs of said normal light sensor corresponding to said plurality of photometry areas;

a colorimetric compensation value determining system that determines a color of an object at each of said plurality of photometry areas in accordance with the outputs of said plurality of colorimetric sensors and determining a colorimetric compensation value based on the determined color; and an exposure value determining system that compensates for the photometry value determined by said photometry value determining system for each of said plurality of photometry areas, and determines an exposure value based on the compensated photometry values, wherein said colorimetric compensation value determining system determines different colorimetric compensation values for different one of said plurality of photometry areas.

2. The photometry device according to claim 1, wherein said colorimetric compensation value determining system determines the colorimetric compensation values such that a colorimetric compensation value at a peripheral area of a photographing frame is smaller than that of a central area of the photographing frame.

3. The photometry device according to claim 1, wherein said colorimetric compensation value determining system determines the colorimetric compensation values for the plurality of photometry areas depending on a distance of each photometry area with respect to the center of a photographing frame.

4. The photometry device according to claim 3, wherein a colorimetric compensation value at an area farther from the center of the photographing frame is smaller than that at an area closer to the center of the photographing frame.

5. The photometry device according to claim 1, wherein said colorimetric compensation value determining system determines the colorimetric compensation values for the plurality of photometry areas depending on data intrinsic to a photographing lens that forms an image of the object.

6. The photometry device according to claim 5, wherein the data intrinsic to the photographing lens includes at least one of a focal length of said photographing lens, an exit pupil position of said photographing lens, and an open f-number of said photographing lens.

7. The photometry device according to claim 5, wherein the data intrinsic to the photographing lens includes a focal length of said photographing lens, and wherein a colorimetric compensation value has a greatest absolute value when the focal length is within a predetermined range, the colorimetric compensation value being smaller when the focal length is greater or smaller than the predetermined range.

8. The photometry device according to claim 7, wherein the colorimetric compensation value is determined as a function of the focal length.

9. The photometry device according to claim 5, wherein the data intrinsic to the photographing lens includes an exit pupil position of said photographing lens, and wherein a colorimetric compensation value has a greatest absolute value when the exit pupil position is within a predetermined range, the colorimetric compensation value being smaller when the exit pupil position is on a front side or rear side with respect to the predetermined range.

10. The photometry device according to claim 9, wherein the colorimetric compensation value is determined as a function of the exit pupil position.

11. The photometry device according to claim 5, wherein the data intrinsic to the photographing lens includes an open f-number of said photographing lens, and wherein a colorimetric compensation value has a greatest absolute value when the open f-number is within a predetermined range, the colorimetric compensation value being smaller when the open f-number is smaller or greater than the predetermined range.

12. The photometry device according to claim 11, wherein the colorimetric compensation value is determined as a function of the open f-number.

13. The photometry device according to claim 1, wherein said colorimetric compensation value determining system determines the colorimetric compensation values for the plurality of photometry areas depending on an area corresponding to a part of an object on which a photographing lens is focused.

14. The photometry device according to claim 13, wherein a colorimetric compensation value for an area corresponding to a part of the object on which the photographing lens is focused is greater than that for an area corresponding to another part of the object on which the photographing lens is not focused.

15. The photometry device according to claim 1, wherein said exposure value determining system has at least one of:
 a. a function of determining the exposure amount by performing a divided photometry, based on the compensated photometry values, in accordance with a predetermined algorithm;
 b. a function of determining the exposure amount by averaging the compensated photometry values for said plurality of photometry areas;
 c. a function of determining the exposure amount by performing the center-weighted averaging of the compensated photometry values; and
 d. a function of determining the exposure amount by selecting one of the compensated photometry values corresponding to said plurality of areas.

16. The photometry device according to claim 1, wherein said normal light photometry sensor and said plurality of colorimetric photometry sensors are arranged on an eyepiece side of a pentagonal prism of a single lens reflex camera, at least said normal light photometry sensor being arranged at an upper central portion of said pentagonal prism.

17. The photometry device according to claim 1, wherein said colorimetric compensation value determining system determines the colorimetric compensation values for said plurality of photometry areas depending on at least one of a distance of each photometry area with respect to a center of a photographing frame, a focal length of a photographing lens, an exit pupil position of said photographing lens, an open f-number of said photographing lens, and an area corresponding to a part of an object on which said photographing lens is focused.

18. A photometry device for a camera, comprising:
 a normal light sensor that has a plurality of photometry areas and performs a photometry operation with respect to an object at each of said plurality of photometry areas, said normal light sensor having spectral sensitive characteristics close to those of a human eye;
 a plurality of colorimetric sensors for colorimetry capable of performing photometry with respect to each of said plurality of photometry areas, said plurality of colorimetric sensors having different spectral sensitivity characteristics;
 a photometry value determiner that determines a photometry value at each of said plurality of photometry areas in accordance with outputs of said normal light sensor corresponding to said plurality of photometry areas;

a colorimetric compensation value determiner that determines a color of an object at each of said plurality of photometry areas in accordance with outputs of said plurality of colorimetric sensors and determining a colorimetric compensation value based on the determined color; and an exposure value determiner that compensates for the photometry value determined by said photometry value determiner for each of said plurality of photometry areas in accordance with the colorimetric compensation value determined by said colorimetric compensation value determiner, and determines an exposure value based on the compensated photometry values;

wherein said colorimetric compensation value determiner determines colorimetric compensation values for said plurality of photometry areas.

19. The photometry device according to claim 18, wherein said colorimetric compensation value determiner determines the colorimetric compensation values such that a colorimetric compensation value at a peripheral area of a photographing flame is smaller than that of a central area of the photographing frame.

20. The photometry device according to claim 18, wherein said colormetric compensation value determiner determines the colorimetric compensation values for the plurality of photometry areas depending on a distance of each photometry area with respect to a center of a photographing frame.

21. The photometry device according to claim 20, wherein a colorimetric compensation value at an area farther from the center of the photographing frame is smaller than that at an area closer to the center of the photographing frame.

22. The photometry device according to claim 18, wherein said colorimetric compensation value determiner determines the colorimetric compensation values for the plurality of photometry areas depending on data intrinsic to a photographing lens that forms an image of the object.

23. The photometry device according to claim 22, wherein the data intrinsic to the photographing lens includes at least one of a focal length of said photographing lens, an exit pupil position of said photographing lens, and an open f-number of said photographing lens.

24. The photometry device according to claim 22, wherein the data intrinsic to the photographing lens includes a focal length of said photographing lens, and wherein a colorimetric compensation value has a greatest absolute value when the focal length is within a predetermined range, the colorimetric compensation value being smaller when the focal length is outside the predetermined range.

25. The photometry device according to claim 24, wherein the colorimetric compensation value is determined as a function of the focal length.

26. The photometry device according to claim 22, wherein the data intrinsic to the photographing lens includes an exit pupil position of said photographing lens, and wherein a colorimetric compensation value has a greatest absolute value when the exit pupil position is within a predetermined range, the colorimetric compensation value being smaller when the exit pupil position is one of a front side and a rear side with respect to the predetermined range.

27. The photometry device according to claim 26, wherein the colorimetric compensation value is determined as a function of the exit pupil position.

28. The photometry device according to claim 22, wherein the data intrinsic to the photographing lens includes an open f-number of said photographing lens, and wherein a colorimetric compensation value has a greatest absolute value when the open f-number is within a predetermined range, the colorimetric compensation value being smaller when the open f-number is not within the predetermined range.

29. The photometry device according to claim 28, wherein the colorimetric compensation value is determined as a function of the open f-number.

30. The photometry device according to claim 18, wherein said colorimetric compensation value determiner determines the colorimetric compensation values for the plurality of photometry areas depending on an area corresponding to a part of an object on which a photographing lens is focused.

31. The photometry device according to claim 30, wherein a colorimetric compensation value for the area corresponding to the part of the object on which the photographing lens is focused is greater than a colorimetric compensation value for an another area corresponding to another part of the object on which the photographing lens is not focused.

* * * * *